(12) United States Patent
Makuta et al.

(10) Patent No.: US 10,379,264 B2
(45) Date of Patent: Aug. 13, 2019

(54) LENTICULAR SHEET, LENTICULAR PRINTED MATERIAL, AND METHOD OF PRODUCING LENTICULAR PRINTED MATERIAL

(71) Applicant: FUJIFILM CORPORATION, Minato-ku, Tokyo (JP)

(72) Inventors: Toshiyuki Makuta, Shizuoka (JP); Yanlong Che, Shizuoka (JP); Masafumi Yoshida, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/049,840

(22) Filed: Jul. 31, 2018

(65) Prior Publication Data

US 2018/0335550 A1 Nov. 22, 2018

Related U.S. Application Data

(63) Continuation of application No. PCT/JP2017/003240, filed on Jan. 30, 2017.

(30) Foreign Application Priority Data

Feb. 12, 2016 (JP) .................................. 2016-024923

(51) Int. Cl.
| | |
|---|---|
| G02B 3/06 | (2006.01) |
| B41M 5/50 | (2006.01) |
| B41M 3/00 | (2006.01) |
| B41J 2/01 | (2006.01) |
| B41M 3/06 | (2006.01) |
| B41M 5/00 | (2006.01) |

(Continued)

(52) U.S. Cl.
CPC ................. *G02B 3/06* (2013.01); *B32B 27/08* (2013.01); *B32B 27/36* (2013.01); *B41J 2/01* (2013.01);

(Continued)

(58) Field of Classification Search
CPC ...... B41M 3/003; B41M 5/502; B41M 5/504; B41M 5/506; B41M 5/508; B41M 5/5218; B41M 5/5254; Y10T 428/24868
See application file for complete search history.

(56) References Cited

U.S. PATENT DOCUMENTS

| | | |
|---|---|---|
| 5,812,152 A | 9/1998 | Torigoe et al. |
| 2002/0025412 A1 | 2/2002 | Hanmura et al. |

(Continued)

FOREIGN PATENT DOCUMENTS

| | | |
|---|---|---|
| EP | 2055497 A2 | 5/2009 |
| JP | H08-101359 A | 4/1996 |

(Continued)

OTHER PUBLICATIONS

Extended European Search Report dated Jan. 11, 2019, issued in corresponding EP Patent Application No. 17750119.4.

(Continued)

*Primary Examiner* — Betelhem Shewareged
(74) *Attorney, Agent, or Firm* — SOLARIS Intellectual Property Group, PLLC

(57) ABSTRACT

A method of producing a lenticular printed material includes: an ink jetting step of jetting an aqueous ink, containing a colorant, resin particles, water and a water-soluble high boiling point solvent, onto an ink receiving layer of a lenticular sheet including a resin layer, a lens layer disposed at one surface side of the resin layer, and the ink receiving layer, which is disposed at the other surface side of the resin layer, which contains particles and a resin, and which has a porous structure and a void volume of 50% or greater, according to an ink jetting method; and a drying step of drying the aqueous ink, under conditions in which a surface temperature of the ink receiving layer is set to 30° C. or higher, to form a parallax picture.

14 Claims, 3 Drawing Sheets

(51) Int. Cl.
| | |
|---|---|
| B41M 5/52 | (2006.01) |
| B41M 7/00 | (2006.01) |
| G02B 3/00 | (2006.01) |
| G03B 35/00 | (2006.01) |
| B32B 27/08 | (2006.01) |
| B32B 27/36 | (2006.01) |
| C09D 11/107 | (2014.01) |
| C09D 11/322 | (2014.01) |
| G02B 27/22 | (2018.01) |
| B42D 25/342 | (2014.01) |

(52) U.S. Cl.
CPC .............. *B41M 3/003* (2013.01); *B41M 3/06* (2013.01); *B41M 5/0011* (2013.01); *B41M 5/0047* (2013.01); *B41M 5/502* (2013.01); *B41M 5/504* (2013.01); *B41M 5/506* (2013.01); *B41M 5/508* (2013.01); *B41M 5/52* (2013.01); *B41M 7/0036* (2013.01); *B42D 25/342* (2014.10); *C09D 11/107* (2013.01); *C09D 11/322* (2013.01); *G02B 3/00* (2013.01); *G02B 27/2214* (2013.01); *G03B 35/00* (2013.01); *B32B 2255/10* (2013.01); *B32B 2255/26* (2013.01); *B32B 2255/28* (2013.01); *B32B 2264/102* (2013.01); *B32B 2307/412* (2013.01); *B32B 2551/00* (2013.01); *B41M 5/5218* (2013.01); *B41M 5/5254* (2013.01); *Y10T 428/24868* (2015.01)

(56) References Cited

U.S. PATENT DOCUMENTS

| | | | |
|---|---|---|---|
| 2002/0071018 A1* | 6/2002 | Tachikawa | ............... B41M 5/52 347/106 |
| 2002/0130943 A1 | 9/2002 | Katoh et al. | |
| 2003/0194539 A1 | 10/2003 | Ohya et al. | |
| 2006/0286315 A1 | 12/2006 | Hashimoto et al. | |
| 2007/0148375 A1* | 6/2007 | Suzuki | ................... B41M 3/003 428/32.1 |
| 2009/0110910 A1 | 4/2009 | Kaimoto | |
| 2013/0216794 A1* | 8/2013 | Takeda | ................... C09D 11/30 428/195.1 |
| 2015/0036220 A1 | 2/2015 | Yamashita et al. | |

FOREIGN PATENT DOCUMENTS

| | | |
|---|---|---|
| JP | H08-137034 A | 5/1996 |
| JP | H09-15766 A | 1/1997 |
| JP | 2002-192830 A | 7/2002 |
| JP | 2003-136836 A | 5/2003 |
| JP | 2004-131740 A | 4/2004 |
| JP | 2005220337 A | 8/2005 |
| JP | 2007-4014 A | 1/2007 |
| JP | 2007-181970 A | 7/2007 |
| JP | 2009-107256 A | 5/2009 |
| JP | 2009-223313 A | 10/2009 |
| JP | 2013-92650 A | 5/2013 |
| JP | 2015-030196 A | 2/2015 |
| JP | 2015-155502 A | 8/2015 |

OTHER PUBLICATIONS

International Search Report issued in International Application No. PCT/JP2017/003240 dated Apr. 18, 2017.

Written Opinion of the ISA issued in International Application No. PCT/JP2017/003240 dated Apr. 18, 2017.

English language translation of the following: Office action dated May 7, 2019 from the JPO in a Japanese patent application No. 2017-566588 corresponding to the instant patent application.

* cited by examiner

LENTICULAR SHEET, LENTICULAR PRINTED MATERIAL, AND METHOD OF PRODUCING LENTICULAR PRINTED MATERIAL

CROSS-REFERENCE TO RELATED APPLICATION

This application is a Continuation of International Application No. PCT/JP2017/003240, filed Jan. 30, 2017, which claims priority to Japanese Patent Application No. 2016-024923 filed Feb. 12, 2016. Each of the above applications is hereby expressly incorporated by reference, in its entirety, into the present application.

BACKGROUND OF THE INVENTION

1. Field of the Invention

The present invention relates to a lenticular sheet, a lenticular printed material, and a method of producing a lenticular printed material.

2. Description of the Related Art

In recent years, a method of producing a printed material using an ink jet type has been widely used since an image can be formed at a high speed, a high-quality image can be formed on various kinds of base materials, and this production method can cope with small lot production.

From the viewpoint of considering the global environment and the work environment, an aqueous ink using water as a vehicle has been known, in addition to a solvent ink using a solvent as a vehicle, as an ink used for producing a printed material according to the ink jet type. In recent years, the production of a printed material using an aqueous ink has been attracting attention from the above-described viewpoint.

As an aqueous ink, for example, an ink composition that contains a compound (a) which contains a hydroxyl group at one terminal, an alkyl group having 1 to 10 carbon atoms at the other terminal, and a carbonyl group in a molecule, and has a molecular weight of 130 to 300, a colorant (b), a polymer (c) having an SP value of 17 to 24, water (d) has been suggested (for example, see JP2015-155502A).

The printed material produced according to the ink jet type is used for applications such as commercial printing applications, sign applications, or lenticular applications. By combining a lens layer of a lenticular sheet and a parallax picture (lenticular image), a stereoscopic image or a lenticular printed material in which the display content is switched depending on a viewing direction is obtained in the lenticular applications.

As the lenticular sheet used for production of a lenticular printed material, for example, a lenticular lens medium which is formed by arranging a plurality of elongated convex portions having a semi-cylindrical shape or an arc shape and has a printed surface on which a toner receiving layer is provided has been suggested (for example, see JP2009-223313A).

SUMMARY OF THE INVENTION

From the viewpoint of the productivity of the lenticular printed material, direct formation of a parallax picture on a lenticular sheet according to the ink jet type has been required. However, even in a case where an aqueous ink described in JP2015-155502A is jetted to a lenticular sheet of the related art described in JP2009-223313A, the aqueous ink is not fixed thereto. Therefore, a parallax picture cannot be formed directly on a lenticular sheet.

Accordingly, a method of bonding paper on which a parallax picture has been formed using an aqueous ink to a lenticular sheet to obtain a lenticular printed material has been used in some cases. According to this method, it is difficult to confirm whether the positions of the lenticular lens and the parallax picture are appropriate until the paper and the lenticular sheet are bonded, and thus the positioning takes times. Further, since the bonding operation is frequently performed manually, it is difficult to obtain a large amount of lenticular printed materials at once.

Further, a method of producing a lenticular printed material by forming a parallax picture directly on a lenticular sheet according to a printing method using a plate such as an ultraviolet (UV) curing offset printing has been used in some cases. It takes time to carry out color matching in a parallax picture and positioning of the lenticular lens and the parallax picture in a case where this method is used.

The present invention has been made in consideration of the above-described circumstances, and an object thereof is to provide a method of producing a lenticular printed material having excellent image sharpness, image switching properties, and productivity; a lenticular printed material produced according to this method; and a lenticular sheet having excellent productivity of a lenticular printed material.

Specific means of the present invention for achieving the above-described object includes the following aspects.

<1> A method of producing a lenticular printed material, comprising: an ink jetting step of jetting an aqueous ink containing a colorant, resin particles, water, and a water-soluble high boiling point solvent onto an ink receiving layer of a lenticular sheet that includes a resin layer, a lens layer disposed at one surface side of the resin layer, and the ink receiving layer which is disposed at the other surface side of the resin layer, which contains particles and a resin, and which has a porous structure and a void volume of 50% or greater, according to an ink jetting method; and a drying step of drying the aqueous ink under conditions in which a surface temperature of the ink receiving layer is set to 30° C. or higher to form a parallax picture.

<2> The method of producing a lenticular printed material according to <1>, in which in the ink jetting step, the aqueous ink is jetted under jetting conditions in which resolution is set to 1200 dpi×1200 dpi (dot per inch) or greater according to the ink jet method which is a single pass method.

<3> The method of producing a lenticular printed material according to <1> or <2>, in which in the ink jetting step, the aqueous ink is jetted under jetting conditions of a minimum liquid droplet size of 3 pl or less.

<4> The method of producing a lenticular printed material according to any one of <1> to <3>, further comprising: a position correcting step of correcting a position for jetting the aqueous ink to be jetted onto the ink receiving layer based on position information of the parallax picture on the lens layer.

<5> A lenticular sheet comprising: a resin layer; a lens layer disposed on one surface side of the resin layer; and an ink receiving layer which is disposed on the other surface side of the resin layer, contains particles and a resin, and has a porous structure and a void volume of 50% or greater.

<6> The lenticular sheet according to <5>, in which a thickness of the ink receiving layer is in a range of from 3 μm to 10 μm.

<7> The lenticular sheet according to <5> or <6>, in which the particles are gas phase method silica particles, and the resin contained in the ink receiving layer is a polyvinyl alcohol-based resin.

<8> The lenticular sheet according to any one of <5> to <7>, in which the void volume of the ink receiving layer is in a range of from 50% to 75%.

<9> The lenticular sheet according to any one of <5> to <8>, in which a light transmittance of the ink receiving layer is 80% or greater.

<10> The lenticular sheet according to any one of <5> to <9>, in which an average primary particle diameter of the particles contained in the ink receiving layer is 2 μm or less.

<11> The lenticular sheet according to any one of <5> to <10>, further comprising: an interlayer which is provided between the resin layer and the lens layer.

<12> The lenticular sheet according to <11>, in which the lens layer and the interlayer are coextruded.

<13> A lenticular printed material comprising: a parallax picture formed using an aqueous ink that contains a colorant, resin particles, water, and a water-soluble high boiling point solvent on the ink receiving layer of the lenticular sheet according to any one of <5> to <12>.

According to the present invention, it is possible to provide a method of producing a lenticular printed material having excellent image sharpness, image switching properties, and productivity; a lenticular printed material produced according to this method; and a lenticular sheet having excellent productivity of a lenticular printed material.

DESCRIPTION OF THE PREFERRED EMBODIMENTS

Figure 1:
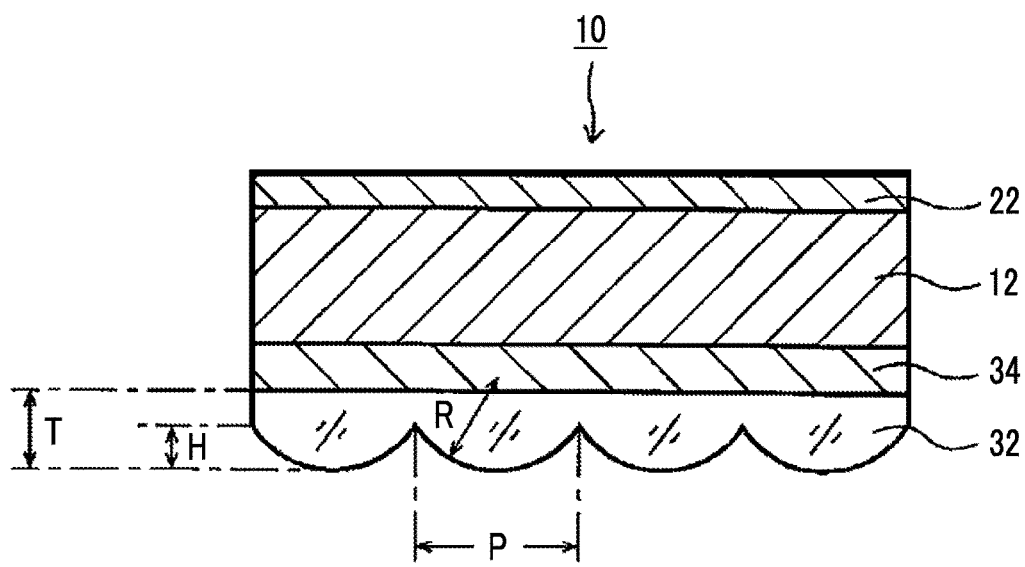
FIG. 1 is a sectional view schematically illustrating an example of a lenticular sheet.

Hereinafter, a method of producing a lenticular printed material of the present invention will be described in detail.

In the present specification, the numerical ranges expressed using "to" indicate the ranges including the numerical values described before and after "to" as the lower limits and the upper limits.

<<Method of Producing Lenticular Printed Material>>

A method of producing a lenticular printed material includes an ink jetting step of jetting an aqueous ink containing a colorant, resin particles, water, and a water-soluble high boiling point solvent to an ink receiving layer of a lenticular sheet that includes a resin layer, a lens layer disposed on one surface side of the resin layer, and an ink receiving layer which is disposed on the other surface side of the resin layer, contains particles and a resin, and has a porous structure and a void volume of 50% or greater, according to an ink jet type; and a drying step of drying the aqueous ink under a condition in which a surface temperature of the ink receiving layer is set to 30° C. or higher to form a parallax picture.

The reason why the effects of the present invention are exerted is not clear, but can be assumed as follows.

Even in a case where a parallax picture is expected to be directly formed using an aqueous ink in a lenticular sheet used for production of a lenticular printed material of the related art, the aqueous ink is unlikely to be fixed so that a lenticular printed material on which a target parallax picture is directly provided is unlikely to be obtained.

As the method of producing a lenticular printed material, a method of bonding paper on which a parallax picture has been formed to a lenticular sheet has been used. Further, a method of producing a lenticular printed material by forming a parallax picture directly on a lenticular sheet using a plate such as ultraviolet (UV) curing offset printing has also been used.

In these production methods, since the productivity is low from the viewpoints of complexity of steps and generation of waste paper, it takes time to position images and desired productivity is not obtained.

In the lenticular printed material according to the present invention, a parallax picture formed on the ink receiving layer of the lenticular sheet is observed from a lens layer side. In other words, the parallax picture formed by applying the aqueous ink from the surface side of the ink receiving layer (the surface side far from the resin layer) is observed from the rear surface side of the ink receiving layer (the surface side closed to the resin layer). Therefore, it is important that the applied aqueous ink enters the inside of the ink receiving layer and then fixed thereto. Further, since there is a concern that a desired image cannot be obtained in a case where the position of the parallax picture with respect to the lens layer is deviated from a predetermined position in the lenticular printed material, the positional relationship between the parallax picture and the lens layer becomes important.

According to the method of producing a lenticular printed material of the present invention, since the lenticular sheet has an ink receiving layer having a porous structure and a void volume of 50% or greater, the aqueous ink enters the inside of the ink receiving layer after being landed on the ink receiving layer, moves close to the resin layer serving as a base material, and then is fixed thereto. Accordingly, the aqueous ink having a desired liquid droplet size is applied so that a high-definition image is formed (that is, an image with excellent image sharpness). As the result, an image can be disposed in a target position. Thereafter, by drying the aqueous ink under a condition in which the surface temperature of the ink receiving layer is set to 30° C. or higher, water contained in the aqueous ink after the drying is unlikely to remain, and thus the aqueous ink is fixed to the ink receiving layer. Since the positional relationship between the lens and the parallax picture fixed to the lenticular sheet is determined with high accuracy, a lenticular printed material with excellent image sharpness and image switching properties is produced.

In a case where a lenticular printed material is produced by performing the above-described step, a parallax picture can be formed directly on the lenticular sheet according to the ink jet type. Consequently, it is considered that, since the step of bonding the paper on which a parallax picture has been formed to the lenticular sheet can be omitted, high-speed printing becomes possible and productivity of the lenticular printed material is excellent.

In addition to the description above, the position of the parallax picture with respect to the lens layer of the lenticular sheet can be easily adjusted by employing the ink jet type as a method of forming an image. Accordingly, it is possible to suppress generation of waste paper and is advantageous in terms of the cost.

<Ink Jetting Step>

The method of producing a lenticular printed material includes an ink jetting step of jetting an aqueous ink containing a colorant, resin particles, water, and a water-soluble high boiling point solvent to an ink receiving layer of a lenticular sheet that includes a resin layer, a lens layer disposed on one surface side of the resin layer, and an ink receiving layer which is disposed on the other surface side of the resin layer, contains particles and a resin, and has a porous structure and a void volume of 50% or greater, according to an ink jet type.

By jetting the aqueous ink to the ink receiving layer having a void volume of 50% or greater in the ink jetting step, the aqueous ink is fixed to the ink receiving layer after the aqueous ink is landed. Therefore, a high-definition parallax picture can be formed directly on the lenticular sheet.

Further, the parallax picture is an image in which the ink receiving layer contains two or more images and different images are displayed depending on the viewpoint of an observer when observed from the lens layer side of the lenticular sheet.

[Lenticular Sheet]

The lenticular sheet includes a resin layer, a lens layer disposed on one surface side of the resin layer, and an ink receiving layer which is disposed on the other surface side of the resin layer, contains particles and a resin, and has a porous structure and a void volume of 50% or greater.

As a layer configuration of the lenticular sheet, as illustrated in FIG. 1, a lenticular sheet 10 having a layer configuration in which an ink receiving layer 22 is provided on one surface side of a resin layer 12 and a lens layer 32 is provided on the other surface side of the resin layer 12 is exemplified. The lenticular sheet may further include an interlayer 34 between the resin layer 12 and the lens layer 32 as illustrated in FIG. 1.

(Ink Receiving Layer)

The ink receiving layer is disposed on one surface side of the resin layer (on a surface side opposite to a side where the lens layer is disposed), contains particles and a resin, and has a porous structure and a void volume of 50% or greater.

Since the ink receiving layer absorbs the landed aqueous ink and fixes the aqueous ink to the inside of the layer, a high-definition image can be formed directly on the lenticular sheet.

By forming a parallax picture on the lenticular sheet including an ink receiving layer, a lenticular printed material can be produced without providing the step of bonding the paper on which a parallax picture has been formed in the production of the lenticular printed material to the lenticular sheet. Therefore, the productivity of the lenticular printed material is excellent.

The ink receiving layer contains particles and a resin. The ink receiving layer may further contain a crosslinking agent that is capable of crosslinking a resin, a mordant, and other components (a surfactant and the like) as necessary in addition to the particles and the resin.

In a case where the ink receiving layer contains particles and a resin, since the resin binds secondary particles formed from the particles, a three-dimensional network structure having secondary particles of the particles as a network chain unit is formed. In other words, the ink receiving layer has a porous structure.

During application of the aqueous ink, the ink receiving layer having the porous structure rapidly absorbs the aqueous ink due to a capillary phenomenon. Therefore, the aqueous ink is fixed to the inside of the ink receiving layer while a change in the size of liquid droplets of the landed aqueous ink is suppressed and a desired size thereof is maintained. As the result, the positions of the parallax picture with respect to the lens layer are easily adjusted to a desired position.

The void volume of the ink receiving layer is 50% or greater, more preferably in a range of 50% to 75%, and still more preferably in a range of 60% to 70%. In a case where the void volume of the ink receiving layer is 50% or greater, the absorption performance of the applied aqueous ink is excellent, and the position of the parallax picture with respect to the lens layer can be adjusted to a desired position. Further, in a case where the void volume of the ink receiving layer is 75% or less, it is possible to suppress loss of particles from the ink receiving layer.

The void volume of the ink receiving layer can be measured according to a mercury press-in method. For example, a mercury porosimeter ("PORE SIZER 9320-PC2" (trade name), manufactured by Shimadzu Corporation) can be used as a measuring device.

The thickness of the ink receiving layer is not particularly limited, but is preferably in a range of 1 μm to 40 μm, more preferably in a range of 2 μm to 30 μm, still more preferably in a range of 3 μm to 20 μm, and particularly preferably in a range of 3 μm to 10 μm.

In a case where the thickness of the ink receiving layer is in the above-described range, a lenticular printed material is suitably produced. In other words, in a case where the thickness of the ink receiving layer is 1 μm or greater, the absorption performance of the aqueous ink is excellent. Further, in a case where the thickness of the ink receiving layer is 40 μm or less, the transparency of the ink receiving layer is excellent.

The pore diameter of the ink receiving layer is preferably in a range of 0.005 μm to 0.030 μm and more preferably in a range of 0.01 μm to 0.025 μm in median diameter.

The median diameter can be measured according to a mercury press-in method. For example, a mercury porosimeter ("PORE SIZER 9320-PC2" (trade name), manufactured by Shimadzu Corporation) can be used as a measuring device.

The light transmittance of the ink receiving layer is preferably 70% or greater, more preferably 80% or greater, and still more preferably 90% or greater.

In a case where the light transmittance of the ink receiving layer is 70% or greater, the visibility of the formed parallax picture is further improved.

The light transmittance of the ink receiving layer can be measured using an ultraviolet-visible-near infrared spectrophotometer (for example, V570 manufactured by JASCO Corporation).

It is preferable that the ink receiving layer has excellent transparency, and the haze value in a case where the ink receiving layer is formed on the transparent film is preferably 30% or less and more preferably 20% or less.

The haze value can be measured using a haze meter (HGM-2DP, manufactured by Suga Test Instruments Co., Ltd.).

Next, each component which can be contained in the ink receiving layer will be described.

—Particles—

The ink receiving layer contains at least one kind of particles.

The particles to be contained in the ink receiving layer are not particularly limited, and any of organic particles and inorganic particles may be used.

Examples of the organic particles include polymer particles obtained by emulsion polymerization, microemulsion polymerization, soap-free polymerization, seed polymerization, dispersion polymerization, and suspension polymerization. Specific examples thereof include powder of polyethylene, polypropylene, polystyrene, polyacrylate, polyamide, a silicone resin, and a phenol resin, powder of a natural polymer or the like, latex-like polymer particles, and emulsion-like polymer particles.

Examples of the inorganic particles include particles of silica (such as colloidal silica or fumed silica), titanium oxide, barium sulfate, calcium silicate, zeolite, kaolinite, halloysite, mica, talc, calcium carbonate, magnesium carbonate, calcium sulfate, zinc oxide, zinc hydroxide, alumina (such as an alumina hydrate or pseudoboehmite), aluminum silicate, calcium silicate, magnesium silicate, zirconium oxide, zirconium hydroxide, cerium oxide, lanthanum oxide, and yttrium oxide.

From the viewpoints of absorption performance and image stability of a liquid component in the aqueous ink, inorganic particles are preferable. From the viewpoint of forming an excellent porous structure, silica particles or alumina particles are preferable.

As the particles, primary particles may be used or secondary particles formed by a plurality of primary particles being aggregated may be used.

Typically, silica particles are roughly classified into wet method particles and dry method (gas phase method) particles according to the production method thereof. As the wet method, a method of obtaining hydrous silica by generating active silica through acid decomposition of silicate, appropriately polymerizing the active silica, and aggregating and settling the polymerized silica is the mainstream. In addition, as the gas phase method, a method of obtaining anhydrous silica using a method of performing high temperature gas phase hydrolysis on silicon halide (flame hydrolysis method) and a method of heating, reducing, vaporizing silica sand and coke in an electric furnace using an arc and then oxidizing the resultant in air (arc method) is the mainstream. Further, the term "gas phase method silica" indicates anhydrous silica particles obtained by a gas phase method. As the silica particles contained in the ink receiving layer, gas phase method silica particles are particularly preferable.

The gas phase method silica and hydrous silica have different properties and are different from each other in terms of the density of a silanol group on the surface and the presence or absence of holes. The gas phase method silica is suitable for forming a porous structure with a high void volume. The reason thereof is not clear, but the density of the silanol group on the surface of particles is in a range of 5 particles/nm$^2$ to 8 particles/nm$^2$, which is high, and silica particles are densely aggregated easily in a case of hydrous silica. On the contrary, in a case of gas phase method silica, since the density of the silanol group on the surface of particles is in a range of 2 particles/nm$^2$ to 3 particles/nm$^2$, which is low, the silica particles are sparsely aggregated (flocculated). As the result, it is assumed that the ink receiving layer containing the gas phase method silica particles has a structure with a high void volume.

Since the gas phase method silica particles have a particularly large specific surface area, the absorption performance of the liquid component in the aqueous ink and holding efficiency are excellent. Further, since the refractive index is small, the transparency can be imparted to the ink receiving layer, and thus a high color density and excellent color developability are obtained. It is important that the ink receiving layer has high transparency from the viewpoint of obtaining the visibility of the parallax picture and a high color density.

Examples of the alumina particles include alumina, an alumina hydrate, a mixture of these, and particles formed from composites.

Among these, an alumina hydrate is preferable from the viewpoints of satisfactorily absorbing water and fixing a colorant, and pseudoboehmite ($Al_2O_3 \cdot nH_2O$) is particularly preferable. Various forms of alumina hydrates can be used, but it is preferable that a sol-like form is used because a smooth layer is easily obtained.

In the pore structure of the alumina particles, the average pore radius is preferably in a range of 1 nm to 25 nm and more preferably in a range of 2 nm to 10 nm. Further, the pore volume is preferably in a range of 0.3 ml/g to 2.0 ml/g and more preferably in a range of 0.5 ml/g to 1.5 ml/g.

Since the pore radius and pore volume of the alumina particles are measured by a nitrogen adsorption and desorption method, the measurement can be performed using a gas adsorption and desorption analyzer (for example, "OMNISORP 369" (trade name, manufactured by Beckman Coulter, Inc.)).

Examples of particles other than those described above include particles in the forms disclosed in JP1998-81064A (JP-H10-81064A), JP1998-119423A (JP-H10-119423A), JP1998-157277A (JP-H10-157277A), JP1998-217601A (JP-H10-217601A), JP1999-348409A (JP-H11-348409A), JP2001-138621A, JP2000-43401A, JP2000-211235A, JP2000-309157A, JP2001-96897A, JP2001-138627A, JP1999-91242A (JP-H11-91242A), JP1996-2087A (JP-H08-2087A), JP1996-2090A (JP-H08-2090A), JP1996-2091A (JP-H08-2091A), JP1996-2093A (JP-H08-2093A), JP1996-174992A (JP-H08-174992A), JP1999-192777A (JP-H11-192777A), and JP2001-301314A.

The average primary particle diameter of the particles contained in the ink receiving layer is preferably 2 μm or less, more preferably 200 nm or less, still more preferably 50 nm or less, even still more preferably 30 nm or less, and particularly preferably 20 nm or less. The lower limit of the average primary particle diameter of the particles is not particularly limited, but is preferably 1 nm or greater, more preferably 2 nm or greater, and still more preferably 3 nm or greater.

In a case where the average primary particle diameter of the particles is 2 μm or less, an ink receiving layer with a high void volume is easily obtained. The average primary particle diameter of the particles indicates a value measured by a particle size distribution measuring device (for example, MICROTRAC UPA (registered trademark) EX150, manufactured by NIKKISO CO., LTD.) that uses light scattering.

In a case where the particles are gas phase method silica particles, the average primary particle diameter of the gas phase method silica particles is preferably 30 nm or less, more preferably 20 nm or less, still more preferably 10 nm or less, and particularly preferably 3 nm to 10 nm.

In the gas phase method silica particles, since particles are likely to adhere to each other due to a hydrogen bond of the silanol group, a structure with a high void volume can be suitably formed in a case where the average primary particle diameter is 30 nm or less and the absorption performance of the aqueous ink can be effectively improved.

The content of the particles contained in the ink receiving layer is preferably 50% by mass or greater and more preferably 60% by mass or greater with respect to the total mass of the solid contents in the ink receiving layer. Further, the content of the particles contained in the ink receiving layer is preferably 90% by mass or less and more preferably 80% by mass or less with respect to the total mass of the solid contents in the ink receiving layer.

In a case where the content of the particles is 50% by mass or greater, an excellent porous structure can be obtained and the absorption properties of the aqueous ink can be improved.

The particles may be used alone or in combination of two or more kinds thereof. Particularly in a case where gas phase method silica particles and other particles are used in combination, the content of the gas phase method silica particles in the whole particles is preferably 30% by mass or greater and more preferably 50% by mass or greater.

—Resin—

The ink receiving layer contains at least one resin (hereinafter, also referred to as a binding resin).

Examples of the binding resin include a resin containing a hydroxy group as a hydrophilic structural unit.

Examples of the resin containing a hydroxy group as a hydrophilic structural unit include a polyvinyl alcohol-based resin [such as polyvinyl alcohol (PVA), acetoacetyl-modified polyvinyl alcohol, cation-modified polyvinyl alcohol, anion-modified polyvinyl alcohol, silanol-modified polyvinyl alcohol, or polyvinyl acetal], a cellulose-based resin [such as methyl cellulose (MC), ethyl cellulose (EC), hydroxyethyl cellulose (HEC), carboxymethyl cellulose (CMC), hydroxypropyl cellulose (HPC), hydroxyethyl methyl cellulose, or hydroxypropyl methyl cellulose], chitins, chitosans, starch, a resin having an ether bond [such as polyethylene oxide (PEO), polypropylene oxide (PPO), polyethylene glycol (PEG), or polyvinyl ether (PVE)], and a resin containing a carbamoyl group [such as polyacrylamide (PAAM), polyvinylpyrrolidone (PVP), or polyacrylic acid hydrazide]. Among these, a polyvinyl alcohol-based resin, a cellulose-based resin, a resin having an ether bond, a resin containing a carbamoyl group, a resin containing a carboxy group, and gelatins are preferable.

Further, a resin containing a carboxy group as a dissociable group may be used as the binding resin. Examples of the resin containing a carboxy group as a dissociable group include polyacrylate, a maleic acid resin, alginate, and gelatins.

Among these, a polyvinyl alcohol-based resin is particularly preferable. Examples of the polyvinyl alcohol include those described in JP1992-52786B (JP-H04-52786B), JP1993-67432B (JP-H05-67432B), JP1995-29479B (JP-H07-29479B), JP2537827B, JP1995-57553B (JP-H07-57553B), JP2502998B, JP3053231B, JP1988-176173A (JP-S63-176173A), JP2604367B, JP1995-276787A (JP-H07-276787A), JP1997-207425A (JP-H09-207425A), JP1999-58941A (JP-H11-58941A), JP2000-135858A, JP2001-205924A, JP2001-287444A, JP1987-278080A (JP-S62-278080A), JP1997-39373A (JP-H09-39373A), JP2750433B, JP2000-158801A, JP2001-213045A, JP2001-328345A, JP1996-324105A (JP-H08-324105A), and JP1999-348417A (JP-H11-348417A).

The binding resin contained in the ink receiving layer may be used alone or in combination of two or more kinds thereof.

The content of the binding resin in the ink receiving layer is preferably in a range of 9% by mass to 40% by mass and more preferably in a range of 12% by mass to 33% by mass with respect to the total mass of the solid contents in the ink receiving layer.

In a case where the content of the binding resin is in the above-described range, the void volume of the ink receiving layer is easily adjusted.

From the viewpoints of increasing the void volume and holding the transparency, the type of binding resin to be combined with the particles (particularly silica particles) becomes important for the ink receiving layer. In a case where gas phase method silica particles are used as the particles, a polyvinyl alcohol-based resin is preferable as the binding resin. Among the examples of the polyvinyl alcohol-based resin, a polyvinyl alcohol-based resin having a saponification degree of 70% to 100 is more preferable and a polyvinyl alcohol-based resin having a saponification degree of 80% to 99.5% is particularly preferable.

Since a polyvinyl alcohol-based resin contains a hydroxyl group in the structural unit thereof and the hydroxyl group and a silanol group of the surface of gas phase method silica particles form a hydrogen bond, a three-dimensional network structure having secondary particles of gas phase method silica particles as a network chain unit is easily formed. It is considered that an ink receiving layer having a porous structure with a high void volume and sufficient strength is formed because of the formation of the three-dimensional network structure.

The ink receiving layer having a porous structure obtained in the above-described manner rapidly absorbs the liquid component of the aqueous ink due to a capillary phenomenon after the aqueous ink has been applied. Therefore, ink bleeding is unlikely to occur and liquid droplets (dots) with excellent circularity can be formed.

Further, the polyvinyl alcohol-based resin may be used in combination with other binding resins. In a case where other binding resins and the polyvinyl alcohol-based resin are used in combination, the content of the polyvinyl alcohol-based resin in all binding resins is preferably 50% by mass or greater and more preferably 70% by mass or greater.

—Content Ratio Between Particles and Binding Resin—

The mass ratio [PB ratio; =x/y] of a mass (x) of the particles to a mass (y) of the binding resin in the ink receiving layer greatly affects the structure and the strength of the ink receiving layer. In other words, the void volume, the pore volume, and the surface area (per unit mass) are increased in a case where the mass ratio (PB ratio) is increased, but the density and the strength tend to decrease.

The PB ratio (x/y) in the ink receiving layer is preferably in a range of 1.5 to 10. In a case where the PB ratio is 10 or less, degradation of the strength and occurrence of cracks during the drying, which are caused by the extremely large PB ratio, are suppressed. Further, in a case where the PB ratio is 1.5 or greater, gaps are easily blocked by the resin in a case where the PB ratio is extremely small, and thus degradation of the absorption performance of the aqueous ink caused by the reduction of the void volume can be suppressed.

Since the stress is occasionally applied to the lenticular sheet in a case where the lenticular sheet passes through a transport system of an ink jet recording device, it is preferable that the ink receiving layer has a sufficient strength. In a case where the sheet is subjected to cutting processing, it is preferable that the ink receiving layer has a sufficient strength from the viewpoints of preventing cracking, peeling, and the like of the ink receiving layer. In view of these points, the PB ratio is more preferably 5 or less. In addition, from the viewpoint of ensuring high-speed aqueous ink absorption performance using the ink jet recording device, the PB ratio is more preferably 2 or greater.

For example, in a case where a resin layer is coated with a coating solution obtained by sufficiently dispersing a binding resin and particles having an average primary particle diameter of 20 nm or less in an aqueous solution at a PB ratio (x/y) of 2 to 5 and then dried, an ink receiving layer in which a three-dimensional network structure having secondary particles of the particles as a network chain is formed and the average pore diameter is 25 nm or less, the void volume is 50% or greater, the pore specific volume is 0.5 ml/g or greater, and the specific surface area is 100 m$^2$/g or greater and which has a porous structure with an excellent light transmitting property can be easily formed.

The void volume, the pore volume, and the specific surface area of the ink receiving layer can be measured according to a mercury press-in method. For example, a mercury porosimeter ("PORE SIZER 9320-PC2" (trade name), manufactured by Shimadzu Corporation) can be used as a measuring device.

—Crosslinking Agent—

It is preferable that the ink receiving layer is a layer which contains, in addition to the above-described particles and the resin, a crosslinking agent which can be obtained by crosslinking a resin and has a porous structure cured by a crosslinking reaction between the crosslinking agent and the resin.

It is preferable that a boron compound is used for crosslinking of a resin, particularly, a polyvinyl alcohol-based resin. Examples of the boron compound include borax, boric acid, borate (such as ortho borate, $InBO_3$, $ScBO_3$, $YBO_3$, $LaBO_3$, $Mg_3(BO_3)_2$, or $Co_3(BO_3)_2$), diborate (such as $Mg_2B_2O_5$ or $Co_2B_2O_5$), metaborate (such as $LiBO_2$, $Ca(BO_2)_2$, $NaBO_2$, or $KBO_2$), tetraborate (such as $Na_2B_4O_7 \cdot 10H_2O$), pentaborate (such as $KB_5O_8 \cdot 4H_2O$, $Ca_2B_6O_{11} \cdot 7H_2O$, or $CsB_5O_5$). Among these, from the viewpoint that the crosslinking reaction proceeds rapidly, borax, boric acid, and borate are preferable and boric acid is particularly preferable.

As the crosslinking agent of the resin, the following compounds other than the boron compound can be also used.

Examples thereof include an aldehyde-based compound such as formaldehyde, glyoxal, or glutaraldehyde; a ketone-based compound such as diacetyl or cyclopentanedione; an active halogen compound such as bis(2-chloroethylurea)-2-hydroxy-4,6-dichloro-1,3,5-triazine or 2,4-dichloro-6-S-triazine sodium salt; an active vinyl compound such as divinylsulfonic acid, 1,3-vinyl sulfonyl-2-propanol, N,N'-ethylenebis(vinylsulfonylacetamide), or 1,3,5-triacryloyl-hexahydro-S-triazine; a N-methylol compound such as dimethylol urea or methylol dimethyl hydantoin; a melamine resin (such as methylol melamine or alkylated methylol melamine); an epoxy resin;

an isocyanate-based compound such as 1,6-hexamethylene diisocyanate; an aziridine-based compound described in U.S. Pat. Nos. 3,017,280A and 2,983,611A; a carboximide-based compound described in U.S. Pat. No. 3,100,704A; an epoxy-based compound such as glycerol triglycidyl ether; an ethyleneimino-based compound such as 1,6-hexamethylene-N,N'-bisethylene urea; a halogenated carboxyaldehyde-based compound such as mucochloric acid or mucophenoxychloric acid; a dioxane-based compound such as 2,3-dihydroxydioxane; a metal-containing compound such as titanium lactate, aluminum sulfate, chrome alum, potassium alum, zirconyl acetate, or chromium acetate; a polyamine compound such as tetraethylene pentamine; a hydrazide compound such as adipic acid dihydrazide; and low molecules or polymers containing two or more oxazoline groups.

The crosslinking agent may be used alone or in combination of two or more kinds thereof.

—Mordant—

For the purpose of further improving water resistance of an image and bleeding resistance with time, the ink receiving layer may contain a mordant. As the mordant, any of an organic mordant such as a cationic mordant and an inorganic mordant such as a water-soluble metal compound can be used. Among these, an organic mordant is preferable and a cationic mordant is particularly preferable.

In a case where the ink receiving layer contains a mordant and an anionic dye is used as a colorant, the mordant interacts with the anionic dye so that the colorant is stabilized and water resistance and bleeding resistance with time can be further improved.

As the cationic mordant, a polymer mordant containing primary to tertiary amino groups or a quaternary ammonium base as cationic functional groups is suitably used.

As the polymer mordant, a mordant obtained as a homopolymer (hereinafter, referred to as a "mordant monomer") of a monomer containing primary to tertiary amino groups and a salt thereof or a quaternary ammonium base, a copolymer of a mordant monomer and another monomer (hereinafter, referred to as a "non-mordant polymer"), or a condensation polymer is preferable. Further, these polymer mordants can be used in the form of water-soluble polymers or water-dispersible latex particles.

Examples of the mordant monomer include trimethyl-p-vinylbenzylammonium chloride, trimethyl-m-vinylbenzylammonium chloride, triethyl-p-vinylbenzyl ammonium chloride, triethyl-m-vinylbenzyl ammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzyl ammonium chloride, N,N-dimethyl-N-phenyl-N-p-vinylbenzylammonium chloride;

trimethyl-p-vinylbenzyl ammonium bromide, trimethyl-m-vinylbenzyl ammonium bromide, trimethyl-p-vinyolbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

products quaternized with methyl chloride, ethyl chloride, methyl bromide, ethyl bromide, methyl iodide, or ethyl iodide of N,N-dimethylaminoethyl (meth)acrylate, N,N-diethyl aminoethyl (meth)acrylate, N,N-dimethyl aminopropyl (meth)acrylate, N,N-diethyl aminopropyl (meth)acrylate, N,N-dimethyl aminoethyl (meth)acrylamide, N,N-diethyl aminoethyl (meth)acrylamide, N,N-dimethyl aminopropyl (meth)acrylamide, and N,N-diethylaminopropyl (meth)acrylamide, a sulfonate formed by substituting these anions, an alkyl sulfonate, an acetate, and an alkyl carboxylate.

Specific examples of the compound include monomethyl diallyl ammonium chloride, trimethyl-2-(methacryloyloxy) ethylammonium chloride, triethyl-2-(methacryloyloxy)ethyl ammonium chloride, trimethyl-2-(acryloyloxy)ethylammonium chloride, triethyl-2-(acryloyloxy)ethylammonium chloride, trimethyl-3-(methacryloyloxy)propyl ammonium chloride, triethyl-3-(methacryloyloxy)propyl ammonium chloride, trimethyl-2-(methacryloylamino)ethylammonium chloride, triethyl-2-(methacryloyl amino)ethylammonium chloride, trimethyl-2-(acryloylamino)ethyl ammonium chloride, triethyl-2-(acryloylamino)ethylammonium chloride, trimethyl-3-(methacryloylamino)propyl ammonium chloride, triethyl-3-(methacryloyl amino)propyl ammonium chloride, trimethyl-3-(acryloylamino)propyl ammonium chloride, triethyl-3-(acryloylamino)propyl ammonium chloride;

N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propyl ammonium chloride, trimethyl-2-(methacryloyloxy)ethylammonium bromide, trimethyl-3-(acryloylamino)propyl ammonium bromide, trimethyl-2-(methacryloyloxy)ethylammonium sulfonate, and trimethyl-3-(acryloylamino)propyl ammonium acetate.

In addition, as monomers which can be copolymerized, N-vinylimidazole, N-vinyl-2-methylimidazole, and the like are exemplified.

Further, allylamine, diallylamine, a derivative thereof, and a salt thereof can be used. Examples of such compounds include allylamine, allylamine hydrochloride, allylamine acetate, allylamine sulfate, diallylamine, diallylamine hydrochloride, diallylamine acetate, diallylamine sulfate, diallylmethylamine, and a salt thereof (as the salt, a hydrochloride, an acetate, a sulfate, or the like), diallylethylamine and a salt thereof (as the salt, a hydrochloride, an acetate, a sulfate, or the like), and a diallyldimethylammonium salt (as a counter anion of the salt, a chloride ion, an acetate ion, a sulfate ion, or the like). According to a general production method, the allylamine and the diallylamine derivative are polymerized in the form of a salt since the polymerizability thereof is degraded in the form of an amine and are desalted as necessary.

Further, a vinylamine unit is obtained through hydrolysis after polymerization using a polymerization unit such as N-vinylacetamide or N-vinylformamide and then made into a salt and can be used.

The non-mordant monomer indicates a monomer which does not contain a basic or cationic portion such as primary to tertiary amino groups and salts thereof or a quaternary ammonium base and does not show an interaction with a colorant in the aqueous ink or shows a substantially small interaction with the colorant.

Examples of the non-mordant monomer include (meth)acrylic acid alkyl ester; (meth)acrylic acid cycloalkyl ester such as (meth)acrylic acid cyclohexyl; (meth)acrylic acid aryl ester such as (meth)acrylic acid phenyl; aralkyl ester such as (meth)acrylic acid benzyl; aromatic vinyls such as styrene, vinyl toluene, and α-methylstyrene; vinyl esters such as vinyl acetate, vinyl propionate, and vinyl versatate; allyl esters such as allyl acetate; a halogen-containing monomer such as vinylidene chloride or vinyl chloride; vinyl cyanide such as (meth)acrylonitrile; and olefins such as ethylene and propylene.

As the (meth)acrylic acid alkyl ester, (meth)acrylic acid alkyl ester in which the number of carbon atoms in an alkyl moiety is in a range of 1 to 18 is preferable, and specific examples thereof include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate. Among these, methyl acrylate, ethyl acrylate, methyl methacrylate, ethyl methacrylate, and hydroxyethyl methacrylate are preferable. The non-mordant monomer may be used alone or in combination of two or more kinds thereof.

Further, preferred examples of the cationic mordant include polydiallyl dimethyl ammonium chloride, polymethacryloyloxyethyl-β-hydroxyethyldimethylammonium chloride, polyethyleneimine, polyallylamine and a derivative thereof, a polyamide-polyamine resin, cationized starch, a dicyandiamide formalin condensate, a dimethyl-2-hydroxypropylammonium salt polymer, polyamidine, polyvinyl amine, a dicyan-based cation resin typified by a dicyandiamide-formalin polycondensate, a polyamine-based cation resin typified by a dicyanamide-diethylenetriamine polycondensate, an epichlorohydrin-dimethylamine addition polymer, a dimethyldiallylammonium chloride-$SO_2$ copolymer, a diallylamine salt-$SO_2$ copolymer, a (meth)acrylate-containing polymer containing a quaternary ammonium base-substituted alkyl group in an ester moiety, and a styryl type polymer containing a quaternary ammonium base-substituted alkyl group.

As polyallylamine or a derivative thereof, various known allylamine polymers and derivatives thereof can be used. Examples of such derivatives include salts of polyallylamine and an acid (as the acid, an inorganic acid such as hydrochloric acid, sulfuric acid, phosphoric acid, or nitric acid; an organic acid such as methanesulfonic acid, toluenesulfonic acid, acetic acid, propionic acid, cinnamic acid, or (meth)acrylic acid; a combination of these; or a portion of allylamine made into a salt), a derivative obtained by a polymer reaction of polyallylamine, and a copolymer of polyallylamine and another copolymerizable monomer (specific examples of the monomer include (meth)acrylic acid esters, styrenes, (meth)amides, acrylonitrile, and vinyl esters).

The concept of (meth)acryl includes both of acryl and methacryl.

Among the cationic mordants, a diallyl dialkyl cationic polymer is preferable and a diallyl dimethyl cationic polymer is particularly preferable. In addition, from the viewpoints of dispersibility and particularly preventing thickening, as the cationic mordant, a cationic polymer having a weight-average molecular weight of $6.0 \times 10^4$ or less is preferable and a cationic polymer having a weight-average molecular weight of $4.0 \times 10^4$ or less is particularly preferable.

Further, the cationic mordant is useful as a dispersant of the above-described particles.

In the present specification, as the weight-average molecular weight, a value measured by gel permeation chromatography (GPC) is employed.

The GPC is performed using HLC-8020GPC (manufactured by TOSOH CORPORATION), three columns of TSK-gel (registered trademark) and Super Multipore HZ-H (manufactured by TOSOH CORPORATION, 4.6 mmID×15 cm), and tetrahydrofuran (THF) as an eluent.

Further, the GPC is performed at a sample concentration of 0.45% by mass, a flow rate of 0.35 ml/min, a sample injection volume of 10 µl, and a measurement temperature of 40° C. using a differential refractive index (RI) detector.

The calibration curve is prepared using 8 samples of "F-40", "F-20", "F-4", "F-1", "A-5000", "A-2500", "A-1000", and "n-propylbenzene" which are "Standard Samples TSK standard, polystyrene" (manufactured by TOSOH CORPORATION).

Examples of the inorganic mordant include polyvalent water-soluble metal salts and hydrophobic metal salt compounds. Specific examples thereof include salts or complexes of metals selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Among the inorganic mordants, an aluminum-containing compound, a titanium-containing compound, a zirconium-containing compound, and metal compounds (salts or complexes) of Group IIIB series in the periodic table of elements are preferable.

The amount of the mordant to be added to the ink receiving layer is preferably in a range of 0.01 $g/m^2$ to 5 $g/m^2$ and more preferably in a range of 0.1 $g/m^2$ to 3 $g/m^2$.

—Other Components—

In addition to the components described above, the ink receiving layer may contain various known additives such as an ultraviolet absorbing agent, an antioxidant, a fluorescent brightening agent, monomers, a polymerization initiator, a polymerization inhibitor, a bleeding inhibitor, a preservative, a viscosity stabilizer, an anti-foaming agent, a surfactant, an antistatic agent, a matting agent, a curl inhibitor, and a water resistant additive, as necessary.

~Formation of Ink Receiving Layer~

The ink receiving layer can be formed by preparing a coating solution (ink receiving layer-forming coating solution) for forming an ink receiving layer and coating one surface side of a resin layer described below with the coating solution. The ink receiving layer may be formed on one surface side of the resin layer before a lens layer described below is formed on the resin layer or may be formed on a surface side of the resin layer, provided with a lens layer, opposite to a side where the lens layer is disposed.

The coating solution for forming an ink receiving layer contains the particles and the resin described above and may further contain the crosslinking agent, the mordant, and other components described above.

The coating solution for forming an ink receiving layer can be prepared in the following manner. Here, a case where gas phase method silica particles are used as the particles and polyvinyl alcohol (PVA) is used as the resin will be described as an example, but the present invention is not limited thereto.

Gas phase method silica particles are added to water together with a dispersant or the like (for example, the content of gas phase method silica particle in water is in a range of 10% by mass to 20% by mass) and are pre-dispersed (primary dispersion) using a homomixer. Next, the obtained dispersion liquid is further dispersed (secondary dispersion) in one pass using a disperser such as ULTIMIZER (manufactured by SUGINO MACHINE LIMITED CO., LTD.) and then a PVA aqueous solution (for example, the mass of PVA is approximately ⅓ of the mass of gas phase method silica particles) is added thereto, thereby preparing the coating solution. It is preferable that a dispersant is used for imparting stability to the coating solution or the pH of the coating solution is adjusted to approximately 9.2 using ammonia water or the like. The obtained coating solution is in a sol state with high uniformity and a porous ink receiving layer having a three-dimensional network structure can be formed by coating one surface side of the resin layer with the coating solution according to a coating method described below and drying the layer.

Examples of the disperser used for dispersion include various known dispersers of the related art such as a colloid mill disperser, a high-speed rotating disperser, a medium stirring type disperser (such as a ball mill or a sand mill), an ultrasonic disperser, and a high-pressure disperser. Among these, from the viewpoint of effectively performing dispersion of secondary particles to be formed, an ultrasonic disperser or a high-pressure disperser (particularly, a high-pressure jet disperser) is preferable.

As the dispersion medium or the vehicle used for preparation of the coating solution for forming an ink receiving layer, water, an organic solvent, or a mixed solution of these can be used. Examples of the organic solvent include alcohols such as methanol, ethanol, n-propanol, i-propanol, and methoxy propanol, ketones such as acetone and methyl ethyl ketone, tetrahydrofuran, acetonitrile, ethyl acetate, and toluene.

It is preferable that the coating solution for forming an ink receiving layer contains a surfactant. Examples of the surfactant include a cationic surfactant, an anionic surfactant, a non-ionic surfactant, an amphoteric surfactant, a fluorine surfactant, and a silicon-based surfactant. The surfactant may be used alone or in combination of two or more kinds thereof.

The content of the surfactant is preferably in a range of 0.001% by mass to 2.0% by mass and more preferably in a range of 0.01% by mass to 1.0% by mass with respect to the total mass of the coating solution for forming an ink receiving layer.

For the purpose of improving the dispersibility of particles in the coating solution for forming an ink receiving layer, the surface of particles may be treated with a silane coupling agent. As the silane coupling agent, a silane coupling agent containing an organic functional group (such as a vinyl group, an amino group, an epoxy group, a mercapto group, a chloro group, an alkyl group, a phenyl group, or an ester group) in a portion other than the portion on which a coupling treatment is performed is preferable.

Further, a cationic polymer can be used as the dispersant. Examples of the cationic polymer include the above-described examples of the mordant. Further, it is preferable to use a silane coupling agent as the dispersant.

The content of the dispersant in the coating solution for forming an ink receiving layer is preferably in a range of 0.1% by mass to 30% by mass and more preferably in a range of 1% by mass to 10% by mass with respect to the mass of the particles.

The ink receiving layer may be formed using a coating solution (1) that contains particles and a resin and a basic solution (2) to which a crosslinking agent has been added. Specifically, a method (Wet-on-Wet method) of applying the basic solution having a pH of 7.1 or greater to the coating layer and crosslinking and curing the coating layer at the same time when the coating solution (1) is applied to form the coating layer or during when (2) the coating layer to be formed by applying the coating solution (1) is dried and before the coating layer shows the decreasing rate of drying. According to this method, the crosslinking agent which is capable of crosslinking the resin contains at least one or both of the coating solution (1) and the basic solution (2).

The ink receiving layer which has been crosslinked and cured according to the above-described method is preferable from the viewpoints of improving absorption performance of the aqueous ink and preventing occurrence of cracks in a layer.

The application of the coating solution for forming an ink receiving layer can be performed according to a known coating method such as coating using an extrusion die coater, an air doctor coater, a blade coater, a rod coater, a knife coater, a squeeze coater, a reserve roll coater, or a bar coater; a spray coating method; or a spin coating method.

(Resin Layer)

The lenticular sheet includes a resin layer as a base material.

The resin forming the resin layer is selected from resins having a light transmitting property.

Examples of the resin that can form a resin layer include polyester (such as polyethylene terephthalate or polyethylene naphthalate), polycarbonate, polysulfone, wholly aromatic polyamide, an acrylic resin (such as polymethyl methacrylate (PMMA) or polymethyl acrylate), a urethane resin, polystyrene, a methacrylate-styrene copolymer resin (MS resin), an acrylonitrile-styrene copolymer resin (AS resin), an ethylene-vinyl alcohol copolymer, modified polyolefin, polypropylene, polyethylene, polyvinyl chloride (PVC), a thermoplastic elastomer, and a cycloolefin polymer.

Further, in the present specification, the acrylic resin indicates a resin having a structural unit derived from (meth)acrylic acid. The acrylic resin may have a structural unit other than the structural unit derived from (meth)acrylic acid.

Among examples of the resin, a resin which has a high light transmitting property in a visible region and is resistant to the heating temperature during formation of the lens layer is preferable. Preferred examples of the resin include polyester such as polyethylene terephthalate or polyethylene naphthalate, polycarbonate, polysulfone, or wholly aromatic polyamide. Particularly from the viewpoint of easily forming a resin layer having excellent smoothness, polyester is preferable and polyethylene terephthalate is more preferable.

A shape of a plate such as a film or a sheet is preferable as the shape of the resin layer.

In a case where the resin layer is stretched, the thickness of the resin layer is determined depending on the stretching ratio. Specifically, the thickness thereof is preferably in a range of 25 μm to 250 μm, more preferably in a range of 50 μm to 250 μm, and still more preferably in a range of 100 μm to 250 μm.

The thermal shrinkage of the resin layer at the time of being heated at 150° C. for 30 minutes is preferably in a range of 0.0%±0.6%, more preferably in a range of 0.0%±0.4%, and still more preferably in a range of 0.0%±0.3%.

In a case where the thermal shrinkage is in a range of 0.0%±0.6%, the deformation of the lenticular sheet caused by heat generated when the aqueous ink is dried can be further suppressed.

The thermal shrinkage can be measured in conformity with "21. Dimensional Change" of JIS C 2151:2006.

It is preferable that the resin layer is a resin layer stretched in at least one direction. In a case where the resin layer is stretched in at least one direction, the heat resistance of the lenticular sheet is improved and deformation caused by heating in the drying step described below can be further suppressed. From the above-described viewpoint, it is more preferable that the resin layer is a biaxially stretched resin layer.

In a case where the resin layer is stretched, in the production of a lenticular sheet, another layer (an ink receiving layer or the like) may be laminated after the resin layer is stretched or the resin layer may be stretched after another layer is laminated on the resin layer.

The resin layer may be stretched in a machine direction (MD) or in a transverse direction (TD). In a case where the resin layer is biaxially stretched, both of the stretching in MD and the stretching in TD are preferably performed.

The stretching ratio in the stretching is preferably in a range of 1.5 times to 7 times, more preferably in a range of 1.7 times to 5 times, and still more preferably in a range of 2 times to 4 times. In a case where the stretching ratio is in a range of 1.5 times to 7 times, the mechanical strength of the resin layer is improved so that the uniformity of the thickness is improved.

The resin layer is stretched at a temperature of preferably 170° C. or higher, more preferably 200° C. to 320° C., and still more preferably 200° C. to 300° C. In a case where the temperature of performing the stretching is higher than or equal to Tg of the resin layer, the heat resistance of the lenticular sheet is improved.

A measured value Tg obtained by actual measurement is applied to the glass transition temperature (Tg).

Specifically, the measured value Tg indicates a value measured using a differential scanning calorimeter (DSC) EXSTAR6220 (manufactured by Seiko Instruments Inc.) under typical measurement conditions. In a case where it is difficult to perform measurement due to decomposition or the like of the material, a calculated value Tg to be calculated by the following calculation formula is applied. The calculated value Tg indicates a value calculated by Formula (1).

$$1/Tg = \Sigma(Xi/Tgi) \qquad (1)$$

Here, it is assumed that the polymer as a target for calculation is formed by copolymerizing n monomer components (i represents 1 to n). Xi represents a weight fraction ($\Sigma Xi=1$) of the i-th monomer and Tgi represents a glass transition temperature (absolute temperature) of a homopolymer of the i-th monomer. Here, $\Sigma$ is obtained by summing 1 to n as i. Further, values in Polymer Handbook (3rd Edition) (written by J. Brandrup, E. H. Immergut (Wiley-Interscience, 1989)) are employed as the value (Tgi) of the glass transition temperature of the homopolymer of each monomer.

~Formation of Resin Layer~

The method of forming a resin layer is not particularly limited. For example, the resin layer may be formed by melting and extruding or stretching the above-described resin for film formation or by forming a commercially available resin sheet or a resin film into a resin layer.

(Lens Layer)

The lenticular sheet includes a lens layer disposed on one surface side (a surface side of the resin layer opposite to a side where the ink receiving layer is disposed) of the resin layer.

As illustrated in FIG. 1, the lens layer 32 may be provided through the interlayer 34.

It is preferable that the lens layer is formed according to a method of melting and coextruding resins used for forming each of the interlayer 34 and the lens layer 32 on one surface side of the resin layer 12 (on a surface side of the resin layer 12 opposite to a side where the ink receiving layer 22 is disposed in a case where the ink receiving layer 22 is disposed on the resin layer 12), and embossing the surface of the resin for forming the lens layer 32 using an embossing roller to form a lens layer.

Further, the lens layer 32 may be formed after the interlayer 34 is formed on the resin layer 12 and the resin layer is stretched in at least one direction.

Examples of the resin forming the lens layer 32 include a polymethyl methacrylate resin (PMMA), a polycarbonate resin, polystyrene, a methacrylate-styrene copolymer resin (MS resin), an acrylonitrile-styrene copolymer resin (AS resin), polypropylene, polyethylene, polyethylene terephthalate (PET), glycol-modified polyethylene terephthalate (PET-G), polyvinyl chloride (PVC), a thermoplastic elastomer, and a cycloolefin polymer. From the viewpoint of ease of performing melt extrusion, it is preferable to use a resin having a low melt viscosity such as polymethyl methacrylate (PMMA), polycarbonate, polystyrene, a methacrylate-styrene copolymer resin (MS resin), polyethylene, polyethylene terephthalate (PET), or glycol-modified polyethylene terephthalate (PET-G). Since the lens shape formed on the surface of the embossing roller is easily transferred and cracks are unlikely to occur in the lens layer at the time of embossing, it is more preferable to use glycol-modified polyethylene terephthalate (PET-G).

Further, as the polyethylene terephthalate (PET), amorphous PET (A-PET) may be used.

Further, the lens layer 32 may contain a plurality of resins.

The lens layer 32 has a thickness (T in FIG. 1) of 50 μm to 200 μm and has a lenticular lens shape in which a plurality of convex lenses in a semi-cylindrical shape are arranged in parallel on the surface. The lenticular lens shape is formed by setting the lens radius (R in FIG. 1) to be in a range of 100 μm to 200 μm, the lens height (H in FIG. 1) to be in a range of 50 μm to 100 μm, and the lens pitch (P in FIG. 1) to be in a range of 100 μm to 257 μm. However, the lens pitch is not limited to the above-described numerical values, and values such as 127 μm and 254 μm may be exemplified. The lenticular lens shape indicates a plate-like lens array in which the shapes obtained by vertically dividing a column are vertically arranged in parallel, that is, a shape in which cylindrical lenses are two-dimensionally arranged.

~Formation of Lens Layer~

A method of forming a lens layer will be described together with a method of forming an interlayer described below.

(Interlayer)

The interlayer 34 may be provided between the resin layer 12 and the lens layer 32. In a case where the resin material constituting the lens layer 32 has adhesiveness to the resin layer 12, the interlayer 34 is not necessarily provided.

It is preferable that the interlayer 34 contains at least a resin. As the resin forming the interlayer 34, a thermoplastic resin having excellent adhesiveness to the lens layer 32 and the resin layer 12 is preferable.

Suitable examples of the thermoplastic resin forming the interlayer 34 include an ethylene-vinyl alcohol copolymer, modified polyolefin such as modified polyethylene or modified polypropylene, polyester, an acrylic resin, and a urethane resin.

The thickness of the interlayer 34 is preferably greater than 0 μm and 10 μm or less and more preferably greater than 0 μm and 0.1 μm or less.

~Formation of Interlayer~

The method of forming each of the interlayer 34 and the lens layer 32 on one surface side of the resin layer 12 (on a surface side of the resin layer 12 opposite to a side where the ink receiving layer 22 is disposed in a case where the ink receiving layer 22 is disposed on the resin layer 12) will be described.

It is preferable that method includes a step of coextruding a first thermoplastic resin for forming the interlayer 34 and a second thermoplastic resin for forming the lens layer 32 on one surface side of the resin layer 12 (on a surface side of the resin layer 12 opposite to a side where the ink receiving layer 22 is disposed in a case where the ink receiving layer 22 is disposed on the resin layer 12); and a step of pressing the laminate, on which the coextruded first thermoplastic resin layer and second thermoplastic resin layer are provided, between an embossing roller having a mold for forming a lenticular lens disposed to face the second thermoplastic resin side and a nip roller disposed to face the resin layer 12 (the ink receiving layer 22 in a case of including the ink receiving layer 22) side and processing the surface of the second thermoplastic resin layer to form a lenticular lens.

For example, an inverted shape for forming the lenticular lens shape is formed on the surface of the embossing roller. The laminated layer formed by laminating two layers which are the first thermoplastic resin and the second thermoplastic resin coextruded on one surface side of the resin layer is pressed between the embossing roller and the nip roller so that the inverted shape of the lenticular lens formed on the surface of the embossing roller is transferred to the surface of the laminated layer of the second thermoplastic resin. The laminated layer of the second thermoplastic resin to which the lenticular lens shape has been transferred is cooled and solidified while being wound around the embossing roller. Next, by the lens layer 32 having a lenticular lens is formed on the surface of the laminated layer of the second thermoplastic resin and a lenticular sheet is obtained by peeling the laminate, which includes the laminated layer formed by laminating two layers which are the first thermoplastic resin and the second thermoplastic resin, from the embossing roller.

As the material of the embossing roller, various steel members, stainless steel, copper, zinc, brass, a material on which plating such as hard chromium plating (HCr plating), copper (Cu) plating, or nickel (Ni) plating is performed using any of these metal materials as a core metal, ceramics, and various composite materials can be employed.

Further, the nip roller is a roller which is disposed to face the embossing roller and presses a resin layer (an ink receiving layer in a case of including an ink receiving layer) with the embossing roller. As the material of the nip roller, various steel members, stainless steel, copper, zinc, brass, and a material formed by performing rubber lining on the surface using any of these metal materials as a core metal can be employed.

The temperature of the embossing roller is set such that the temperature of the second thermoplastic resin in a press portion is set to higher than or equal to the glass transition temperature. This setting is made in order for the laminated layer of the second thermoplastic resin not to be cooled or solidified until the mold transfer of the surface of the laminated layer is completed.

The thickness of the lenticular sheet is appropriately in a range of 30 μm to 400 μm. Further, a thin lenticular sheet having relatively high production difficulty from the viewpoints of mechanical strength and recognizability of a parallax picture, for example, a lenticular sheet having a thickness of 100 μm to 200 μm can be easily obtained.

[Aqueous Ink]

The aqueous ink contains a colorant, resin particles, water, and a water-soluble high boiling point organic solvent.

The aqueous ink may contain components other than those described above as necessary. Examples of other components include a surfactant, colloidal silica, urea, a water-soluble polymer compound, an antifoaming agent, and wax particles.

(Colorant)

The aqueous ink contains at least one colorant.

The colorant contained in the aqueous ink is not particularly limited and can be appropriately selected from pigments and dyes. As the colorant, a pigment is preferable and a resin-coated pigment having a structure in which at least a part of the surface of the pigment is coated with a resin (hereinafter, also referred to as a "coating resin") is more preferable. In this manner, the dispersion stability of the aqueous ink is improved and the quality of an image to be formed is improved.

—Pigment—

The pigment is not particularly limited and can be appropriately selected depending on the purpose thereof. For example, the pigment may be any of an organic pigment and an inorganic pigment. Further, a carbon black pigment, a magenta pigment, a cyan pigment, or a yellow pigment may be used as a color pigment. From the viewpoint of colorability of the aqueous ink, it is preferable that the pigment is almost insoluble or hardly soluble in water.

Examples of the organic pigment include an azo pigment, a polycyclic pigment, chelate dye, a nitro pigment, a nitroso pigment, and aniline black. Among these, an azo pigment and a polycyclic pigment are preferable.

Examples of the inorganic pigment include titanium oxide, iron oxide, calcium carbonate, barium sulfate, aluminum hydroxide, yellow barium, cadmium red, chrome yellow, and carbon black.

From the viewpoints of color reproducibility, it is preferable that the average primary particle diameter of the pigment is small. However, from the viewpoint of light fastness, it is preferable that the average primary particle diameter thereof is large. From the viewpoint of balancing these, the average primary particle diameter thereof is preferably in a range of 10 nm to 200 nm, more preferably in a range of 10 nm to 150 nm, and still more preferably in a range of 10 nm to 120 nm. Further, the particle size distribution of the pigment is not particularly limited, and any of a pigment having a wide particle size distribution and a pigment having a monodispersed particle size distribution may be used. In addition, two or more pigments having a monodispersed particle size distribution may be mixed and then used.

The average primary particle diameter can be measured according to the above-described method. Further, as the particle size distribution, a value measured by a particle size distribution measuring device (for example, MICROTRAC UPA (registered trademark) EX150, manufactured by NIKKISO CO., LTD.) that uses light scattering is employed.

The pigment may be used alone or in combination of two or more kind thereof.

From the viewpoint of the image density, the content of the pigment in the aqueous ink is preferably in a range of 1% by mass to 20% by mass and more preferably in a range of 2% by mass to 10% by mass with respect to the total amount of the aqueous ink.

—Coating Resin—

As the coating resin contained in the resin-coated pigment, a dispersant is preferable and a polymer dispersant is more preferable. The polymer dispersant may be any of a water-soluble dispersant and a water-insoluble dispersant.

Among polymer dispersants, hydrophilic polymer compounds are exemplified as the water-soluble dispersant. Examples of natural hydrophilic polymer compounds include vegetable polymers such as Arabic gum, tragacanth gum, guar gum, karaya gum, locust bean gum, arabinogalactone, pectin, and quince seed starch; seaweed-based polymers such as alginic acid, carrageenan, and agar; animal polymers such as gelatin, casein, albumin, and collagen; and microbial polymers such as xanthan gum and dextran.

Further, examples of the hydrophilic polymer compound obtained by modifying a natural product with a raw material include fibrous polymers such as methyl cellulose, ethyl cellulose, hydroxyethyl cellulose, hydroxypropyl cellulose, and carboxymethyl cellulose; starch-based polymers such as sodium starch glycolate and sodium starch phosphoric acid ester; and seaweed-based polymers such as sodium alginate and propylene glycol alginic acid ester.

Further, examples of synthetic hydrophilic polymer compounds include a vinyl-based polymer such as polyvinyl alcohol, polyvinylpyrrolidone, or polyvinyl methyl ether; an acrylic resin such as non-crosslinked polyacrylamide, polyacrylic acid or an alkali metal salt thereof, or a water-soluble styrene acrylic resin; and a natural polymer compound such as a water-soluble styrene maleic acid resin, a water-soluble vinyl naphthalene acrylic resin, a water-soluble vinyl naphthalene maleic acid resin, an alkali metal salt of a β-naphthalenesulfonic acid formalin condensate, a polymer compound having a salt of a cationic functional group such as quaternary ammonium or an amino group, or a natural polymer compound such as shellac.

Among these, a water-soluble dispersant into which a carboxy group is introduced, such as a homopolymer of acrylic acid, methacrylic acid, or styrene acrylic acid; or a copolymer with monomers having other hydrophilic groups, is preferable.

Among the polymer dispersants, a polymer having both of a hydrophobic part and a hydrophilic part can be used as a water-insoluble dispersant. As a hydrophilic part, a structural unit having an acidic group is preferable and a structural unit having a carboxy group is more preferable. Examples of the water-insoluble dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, and a styrene-maleic acid copolymer.

Specific examples thereof include water-insoluble resins described in JP2005-41994A, JP2006-273891A, JP2009-084494A, and JP2009-191134A.

The weight-average molecular weight of the polymer dispersant is preferably in a range of $3.0 \times 10^3$ to $1.00 \times 10^5$, more preferably in a range of $5.0 \times 10^3$ to $5.0 \times 10^4$, still more preferably in a range of $5.0 \times 10^3$ to $4.0 \times 10^4$, and particularly preferably in a range of $1.0 \times 10^4$ to $4.0 \times 10^4$.

Further, the weight-average molecular weight of the polymer dispersant indicates a value acquired by the above-described method.

From the viewpoint of self-dispersibility, it is preferable that the polymer dispersant contains a carboxy group, more preferable that the polymer dispersant contains a carboxy group and having an acid value of 130 mgKOH/g or less, and still more preferable that the polymer dispersant has an acid value of 25 mgKOH/g to 120 mgKOH/g. Particularly, a polymer dispersant containing a carboxy group and having an acid value of 25 mgKOH/g to 100 mgKOH/g is effective.

The mixing mass ratio (p:s) of the pigment (p) to the dispersant (s) is preferably in a range of 1:0.06 to 1:3, more preferably in a range of 1:0.125 to 1:2, and still more preferably in a range of 1:0.125 to 1:1.5.

The content of the coating resin used for coating a pigment is preferably in a range of 0.5% by mass to 3.0% by mass, more preferably in a range of 1.0% by mass to 2.8% by mass, and still more preferably in a range of 1.2% by mass to 2.5% by mass with respect to the total mass of the aqueous ink.

The volume average particle diameter (secondary particle diameter) of the resin-coated pigment (pigment in a dispersed state) is preferably in a range of 10 nm to 200 nm, more preferably in a range of 10 nm to 150 nm, and still more preferably in a range of 10 nm to 100 nm. In a case where the volume average particle diameter thereof is 200 nm or less, the color reproducibility becomes excellent and the jetting property at the time of jetting the ink according to the ink jet method becomes excellent. In a case where the volume average particle diameter thereof is 10 nm or greater, the light fastness becomes excellent.

As the volume average particle diameter (secondary particle diameter), a value measured by a particle size distribution measuring device (for example, MICROTRAC UPA (registered trademark) EX150, manufactured by NIKKISO CO., LTD.) that uses light scattering is employed.

In addition, the particle size distribution of the resin-coated pigment is not particularly limited and may be any of a wide particle size distribution and a monodispersed particle size distribution. Further, the colorant having a monodispersed particle size distribution may be used by mixing two or more kinds thereof. Here, the volume average particle diameter of the pigment in a dispersed state indicates an average particle diameter in a state in which the ink is obtained, and the same applies to a so-called concentrated ink dispersion at a stage before the ink is obtained.

Further, it is preferable that the resin used for coating the pigment in the resin-coated pigment is crosslinked by a crosslinking agent.

In other words, it is preferable that the resin-coated pigment is a resin-coated pigment in which at least a part of the surface of the pigment is coated with the resin that is crosslinked by a crosslinking agent.

In regard to the resin-coated pigment in which at least a part of the surface of the pigment is coated with the resin that is crosslinked by a crosslinking agent, description in paragraphs 0029 to 0048, 0110 to 0118, and 0121 to 0129 of JP2012-162655A and paragraphs 0035 to 0071 of JP2013-47311A can be referred to.

The dispersion of the pigment in the aqueous ink may also be carried out according to a method of using a low-molecular-weight surfactant-type dispersant in addition to the method of using a polymer dispersant. As the low-molecular-weight surfactant-type dispersant, for example, known low-molecular-weight surfactant-type dispersants described in paragraphs 0047 to 0052 of JP2011-178029A can be used.

The crosslinking agent is not particularly limited as long as the crosslinking agent is a compound having two or more sites reacting with a resin. Among examples of such a compound, from the viewpoint of excellent reactivity with a carboxy group, a compound (bi- or higher functional epoxy compound) having two or more epoxy groups is preferable.

Specific examples of the crosslinking agent include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether. Among these, polyethylene glycol diglycidyl ether, diethylene glycol diglycidyl ether, and trimethylolpropane triglycidyl ether are preferable.

Commercially available products can be used as the crosslinking agent. Examples of the commercially available products include Denacol (registered trademark) EX-321, EX-821, EX-830, EX-850, and EX-851 (manufactured by ChemteX Corporation).

From the viewpoints of the crosslinking reaction rate and dispersion stability after the crosslinking, the molar ratio between a crosslinking site (for example, an epoxy group) of the crosslinking agent and a crosslinked site of a resin (for example, a carboxy group) is preferably in a range of 1:1 to 1:10, more preferably in a range of 1:1 to 1:5, and most preferably in a range of 1:1 to 1:1.5.

(Resin Particles)

The aqueous ink contains at least one kind of resin particles. In this manner, an image is easily fixed onto the lenticular sheet.

As the resin particles, for example, particles formed of a resin selected from thermoplastic resins and thermosetting resins can be used.

These resins may be modified resins.

Examples of the resin include an acrylic resin, an epoxy resin, a urethane resin, polyether, polyamide, unsaturated polyester, polyolefin, a phenol resin, a silicone resin, a fluorine resin, polyvinyl (such as vinyl chloride, vinyl acetate, polyvinyl alcohol, or polyvinyl butyral), an alkyd resin, a polyester resin (such as a phthalic acid resin), and an amino resin (such as a melamine resin, a melamine formaldehyde resin, an amino alkyd co-condensation resin, a urea resin, or a urea resin).

The resin may be a copolymer having two or more structural units forming resins exemplified above or a mixture of two or more resins. As the resin particles, not only particles formed of a mixture of two or more resins but also composite resin particles formed by two or more resins being laminated as in a case of a core and shell may be exemplified.

The resin particles may be used alone or in combination of two or more kinds thereof.

As the resin particles, particles of an acrylic resin, a urethane resin, polyether, polyester, or polyolefin are preferable. From the viewpoints of stability and the quality of the formed film (image), particles of an acrylic resin or particles of a urethane resin are more preferable.

The aqueous ink may contain resin particles in the form of an aqueous dispersion containing the resin particles, that is, so-called latex.

The glass transition temperature (Tg) of the resin is preferably 30° C. or higher.

The upper limit of the glass transition temperature of the resin is preferably 250° C. The glass transition temperature of the resin is preferably in a range of 50° C. to 230° C.

The glass transition temperature of resin particles is appropriately controlled by a method which has been typically used. For example, the glass transition temperature of resin particles can be controlled to be in a desired range by appropriately selecting the type of monomer (polymerizable compound) forming the resin particles, the configuration ratio thereof, and the molecular weight of a polymer forming the resin particles.

As the glass transition temperature, a value measured according to the above-described method is employed.

As the resin particles, resin particles obtained by a phase-transfer emulsification method are preferable and particles of a self-dispersing polymer (self-dispersing polymer particles) are more preferable.

Here, the self-dispersing polymer indicates a water-insoluble polymer which may enter a dispersed state in an aqueous medium by a functional group (particularly, an acidic group of a carboxy group or the like or a salt thereof)

contained in the polymer itself in a case where the polymer has entered the dispersed state according to the phase-transfer emulsification method in the absence of a surfactant.

Here, the concept of the dispersed state includes both of an emulsified state (emulsion) in which a water-insoluble polymer is dispersed in the aqueous medium in a liquid state and a dispersed state (suspension) in which a water-insoluble polymer is dispersed in the aqueous medium in a solid state.

In addition, the term "water-insoluble" means that the amount of substance to be dissolved in 100 parts by mass (25° C.) of water is less than 5.0 parts by mass.

As the phase-transfer emulsification method, a method of dissolving or dispersing a polymer in a vehicle (for example, a water-soluble solvent), putting the solution into water without adding a surfactant thereto, stirring and mixing the solution, and removing the vehicle in a state in which a salt-forming group (for example, an acidic group) contained in the polymer is neutralized to obtain an aqueous dispersion in an emulsified or dispersed state may be exemplified.

The self-dispersing polymer particles can be selected from among self-dispersing polymer particles described in paragraphs 0090 to 0121 of JP2010-64480A and paragraphs 0130 to 0167 of JP2011-068085A and then used. Particularly, it is preferable that particles having a glass transition temperature of 100° C. or higher are selected from among self-dispersing polymer particles described in the same publications and then used.

As described above, self-dispersing polymer particles containing a carboxy group are preferable as the self-dispersing polymer particles.

The form of particles formed of a polymer having a structural unit derived from unsaturated carboxylic acid (preferably (meth)acrylic acid) is a more preferable form of the self-dispersing polymer particles containing a carboxy group.

The form of particles formed of a polymer which has a structural unit having an alicyclic group, a structural unit having an alkyl group, and a structural unit derived from unsaturated carboxylic acid (preferably (meth)acrylic acid) is a still more preferable form of the self-dispersing polymer particles containing a carboxy group.

The content (total content in a case where two or more structural units are included in the polymer) of the structural unit having an alicyclic group in the polymer is preferably in a range of 3% by mass to 95% by mass, more preferably in a range of 5% by mass to 75% by mass, and still more preferably in a range of 10% by mass to 50% by mass with respect to the total amount of the polymer.

The content (total content in a case where two or more structural units are included in the polymer) of the structural unit having an alkyl group in the polymer is preferably in a range of 5% by mass to 90% by mass, more preferably in a range of 10% by mass to 85% by mass, still more preferably in a range of 20% by mass to 80% by mass, even still more preferably in a range of 30% by mass to 75% by mass, and even still more preferably in a range of 40% by mass to 75% by mass with respect to the total amount of the polymer.

The content (total content in a case where two or more structural units are included in the polymer) of the structural unit derived from an unsaturated carboxylic acid (preferably (meth)acrylic acid) in the polymer is preferably in a range of 2% by mass to 30% by mass, more preferably in a range of 5% by mass to 20% by mass, and still more preferably in a range of 5% by mass to 15% by mass with respect to the total amount of the polymer.

Further, a form in which the structural unit having an alicyclic group is changed into a structural unit having an aromatic group or a form which has a structural unit having an aromatic group in addition to the structural unit having an alicyclic group, in the "still more preferable form of the self-dispersing polymer particles containing a carboxy group" described above, is also preferable as the form of self-dispersing polymer particles containing a carboxy group.

In both forms, the total content of the structural unit having an alicyclic group and a structural unit having an aromatic group is preferably in a range of 3% by mass to 95% by mass, more preferably in a range of 5% by mass to 75% by mass, and still more preferably in a range of 10% by mass to 50% by mass with respect to the total amount of the polymer.

It is preferable that the structural unit having an alicyclic group is a structural unit derived from alicyclic (meth)acrylate.

Examples of the alicyclic (meth)acrylate include monocyclic (meth)acrylate, bicyclic (meth)acrylate, and tricyclic (meth)acrylate.

Examples of the monocyclic (meth)acrylate include cycloalkyl (meth)acrylate in which the number of carbon atoms in a cycloalkyl group is in a range of 3 to 10, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and isobornyl (meth)acrylate.

Examples of the tricyclic (meth)acrylate include adamantly (meth)acrylate, dicyclopentanyl (meth)acrylate, and dicyclopentenyloxyethyl (meth)acrylate.

The alicyclic (meth)acrylate may be used alone or by mixing two or more kinds thereof.

Among the examples of the alicyclic (meth)acrylate, from the viewpoints of fixing properties, blocking resistance, and dispersion stability of self-dispersing polymer particles, bicyclic (meth)acrylate or tri- or higher cyclic polycyclic (meth)acrylate is preferable; and isobornyl (meth)acrylate, adamantly (meth)acrylate, or dicyclopentenyl (meth)acrylate is more preferable.

As the structural unit having an aromatic group, a structural unit derived from an aromatic group-containing monomer is preferable.

Examples of the aromatic group-containing monomer include an aromatic group-containing (meth)acrylate monomer (such as phenoxyethyl (meth)acrylate, benzyl (meth)acrylate, or phenyl (meth)acrylate) and a styrene-based monomer.

Among these, from the viewpoints of balancing between the hydrophilicity and the hydrophobicity of the polymer chain and ink fixing properties, an aromatic group-containing (meth)acrylate monomer is preferable; phenoxyethyl (meth)acrylate, benzyl (meth)acrylate, or phenyl (meth)acrylate is more preferable; and phenoxyethyl (meth)acrylate or benzyl (meth)acrylate is still more preferable.

As the structural unit having an alkyl group, a structural unit derived from an alkyl group-containing monomer is preferable.

Examples of the alkyl group-containing monomer include alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl (meth)acryl amide, N-methoxyethyl (meth)acrylamide, N-ethoxyethyl (meth)acrylamide, or N-(n-,iso) butoxyethyl (meth)acryl amide.

Among these, alkyl (meth)acrylate is preferable; alkyl (meth)acrylate in which the number of carbon atoms in an alkyl group is in a range of 1 to 4 is more preferable; methyl (meth)acrylate, ethyl (meth)acrylate, isopropyl (meth)acrylate, or butyl (meth)acrylate is still more preferable; and methyl (meth)acrylate is even still more preferable.

Hereinafter, exemplary compounds P-1 to P-5 will be described as specific examples of the self-dispersing polymer particles, but the present invention is not limited to these examples. Further, the numerical values in the parenthesis indicate the mass ratios of the copolymer components.

P-1: methyl methacrylate/isobornyl methacrylate/methacrylic acid copolymer (70/20/10)
P-2: methyl methacrylate/isobornyl methacrylate/methacrylic acid copolymer (48/42/10)
P-3: methyl methacrylate/benzyl methacrylate/methacrylic acid copolymer (65/25/10)
P-4: isopropyl methacrylate/isobornyl methacrylate/methacrylic acid copolymer (50/40/10)
P-5: butyl methacrylate/dicyclopentanyl methacrylate/methacrylic acid copolymer (60/30/10)

The weight-average molecular weight of the polymer forming resin particles (preferably self-dispersing polymer particles, the same applies hereinafter) is preferably in a range of $3.0 \times 10^3$ to $2.00 \times 10^5$, more preferably in a range of $5.0 \times 10^3$ to $1.50 \times 10^5$, and still more preferably in a range of $1.0 \times 10^4$ to $1.00 \times 10^5$.

In a case where the weight-average molecular weight is $3.0 \times 10^3$ or greater, the amount of water-soluble components can be effectively suppressed. Further, the self-dispersion stability can be improved by setting the weight-average molecular weight to 200000 or less.

As the weight-average molecular weight, a value measured by the above-described gel permeation chromatography (GPC) is employed.

From the viewpoint of self-dispersibility, the acid value of the polymer forming the resin particles is preferably 100 mgKOH/g or less and more preferably in a range of 25 mgKOH/g to 100 mgKOH/g.

The volume average particle diameter of the resin particles is preferably in a range of 1 nm to 200 nm, more preferably in a range of 1 nm to 150 nm, still more preferably in a range of 1 nm to 100 nm, and particularly preferably in a range of 1 nm to 10 nm. In a case where the volume average particle diameter thereof is 1 nm or greater, the manufacturing suitability is improved. Further, in a case where the volume average particle diameter is 200 nm or less, the storage stability is improved. Further, the particle size distribution of resin particles is not particularly limited, and the resin particles may be a wide particle size distribution or a monodispersed particle size distribution. Two or more kinds of resin particles may be mixed and then used.

As the volume average particle diameter, a value measured according to the above-described method is employed.

The content (total content in a case where two or more kinds of resin particles are contained in the aqueous ink) of the resin particles (preferably self-dispersing polymer particles) in the aqueous ink is not particularly limited, but is preferably in a range of 0.3% by mass to 15.0% by mass, more preferably in a range of 4.0% by mass to 12.0% by mass, and still more preferably in a range of 7.0% by mass to 9.0% by mass with respect to the total amount of the aqueous ink.

In a case where the content of the resin particles in the aqueous ink is 0.3% by mass or greater, the rub resistance of an image is further improved and the image irregularity can be further suppressed.

In a case where the content of the resin particles in the aqueous ink is 15.0% by mass or less, the jettability of the ink can be further improved.

(Water)

The aqueous ink contains water. The content of water contained in the aqueous ink is not particularly limited, but the content of water can be set to 50% by mass or greater with respect to the total amount of the aqueous ink.

The content of water contained in the aqueous ink is preferably in a range of 50% by mass to 80% by mass, more preferably in a range of 50% by mass to 75% by mass, and still more preferably in a range of 50% by mass to 70% by mass with respect to the total amount of the aqueous ink.

(Water-soluble High Boiling Point Solvent)

The aqueous ink contains at least one water-soluble high boiling point solvent.

In a case where the aqueous ink contains a water-soluble high boiling point solvent, jettability from a head and storage stability are ensured.

The term "water-soluble" means that the amount of substance to be dissolved in 100 parts by mass (25° C.) of water is 5.0 parts by mass or greater.

The boiling point of the water-soluble high boiling point solvent is preferably 200° C. or higher, more preferably in a range of 200° C. to 400° C., and still more preferably in a range of 300° C. to 400° C.

In a case where the boiling point is 200° C. or higher, the jettability of the aqueous ink and the storage stability are further excellent. Further, in a case where the boiling point is 400° C. or lower, the viscosity of the aqueous ink is not extremely increased and the jettability is further excellent.

The boiling point can be acquired using a boiling point measuring device (boiling point measuring device Dosa-Therm 300, manufactured by Titan Technologies Inc.).

As the water-soluble high boiling point solvent, known solvents can be used without particular limitation.

Examples of the water-soluble high boiling point solvent include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol; polyhydric alcohols, for example, alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-42150A. One or two or more solvents can be appropriately selected from among these solvents and then used. Polyhydric alcohols are useful as an anti-drying agent and a wetting agent, and examples thereof include those described in paragraph 0117 of JP2011-42150A. In addition, a polyol compound is preferable as a penetrating agent, and examples of an aliphatic diol include those described in paragraph 0117 of JP2011-42150A.

Further, other water-soluble high boiling point solvents can be appropriately selected from among water-soluble solvents described in paragraphs 0176 to 0179 of JP2011-46872A and water-soluble solvents described in paragraphs 0063 to 0074 of JP2013-18846A.

The content of the water-soluble high boiling point solvent (the total content in a case where two or more solvents are contained in the aqueous ink) in the aqueous ink is preferably in a range of 2% by mass to 20% by mass with respect to the total amount of the aqueous ink.

In a case where the total content thereof is 2% by mass or greater, the jettability from a head and the storage stability are further improved.

The total content of the water-soluble high boiling point solvent is more preferably in a range of 3% by mass to 20% by mass and more preferably in a range of 5% by mass to 18% by mass with respect to the total amount of the aqueous ink.

It is more preferable that the aqueous ink contains a solvent A represented by Structural Formula (I) and at least one solvent B selected from ethylene glycol, diethylene glycol, triethylene glycol, tetraethylene glycol, and pentaethylene glycol as a water-soluble high boiling point solvent.

With such a composition, the jettability and the storage stability are further improved.

In a case where the aqueous ink contains the solvent A and the solvent B, the content of the solvent A is in a range of 1.0% by mass to 10.0% by mass with respect to the total amount of the aqueous ink, and the content (on a mass basis) of the solvent B with respect to the total amount of the aqueous ink is preferably in a range of 0.05 times to 20.0 times the content (on a mass basis) of the solvent A with respect to the total amount of the aqueous ink.

In the present specification, the expression "the content (on a mass basis) of the solvent B with respect to the total amount of the aqueous ink is in a range of a times to b times (for example, 0.05 times to 20.0 times) the content (on a mass basis) of the solvent A with respect to the total amount of the aqueous ink" is also described as "the ratio [mass of solvent B/mass of solvent A] is in a range of a to b (for example, 0.05 to 20.0)".

The ratio [mass of solvent B/mass of solvent A] is preferably in a range of 0.1 to 15.0 and more preferably in a range of 0.2 to 10.0.

In a case where the aqueous ink contains the solvent A and the solvent B, the total content of the solvent A and the solvent B is preferably in a range of 2.0% by mass to 30.0% by mass, more preferably in a range of 3.0% by mass to 20.0% by mass, and still more preferably in a range of 5.0% by mass to 15.0% by mass with respect to the total amount of the aqueous ink.

In the case where the aqueous ink contains the solvent A and the solvent B, the content of the solvent B is preferably in a range of 0.5% by mass to 20.0% by mass, more preferably in a range of 1.0% by mass to 15.0% by mass, and still more preferably in a range of 2.0% by mass to 10.0% by mass with respect to the total amount of the aqueous ink.

—Solvent A—

The solvent A is at least one selected from the compounds represented by Structural Formula (I). The solvent A may be a solvent formed of one compound (single component) selected from compounds represented by Structural Formula (I) or a mixed solvent formed of two or more kinds of compounds selected from compounds represented by Structural Formula (I).

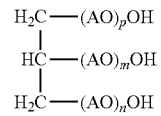

Structural Formula (I)

In Structural Formula (I), p, m, and n each independently represent an integer of 0 or greater and p+m+n is in a range of 0 to 15. In the range, p+m+n is preferably in a range of 3 to 12 and more preferably in a range of 3 to 10. In Structural Formula (I), AO represents an ethyleneoxy group or a propyleneoxy group, and a propyleneoxy group is preferable. In a case where p+m+n is greater than or equal to 2, two or more AO's may be the same as or different from each other.

As the compounds represented by Structural Formulae (I), glycerin or an alkylene oxide adduct of glycerin is preferable.

Hereinafter, examples of the compounds represented by Structural Formula (I) will be described. However, in the present invention, the compounds are not limited to these examples.

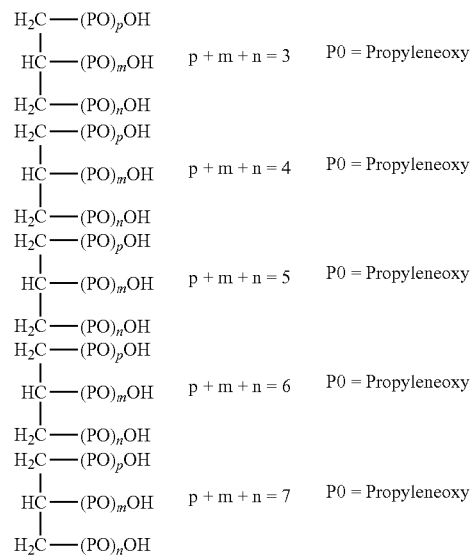

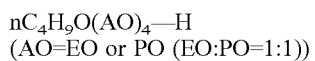
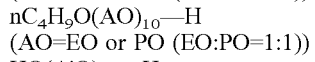
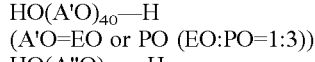
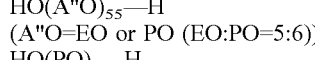
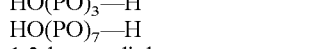
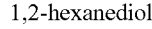
1,2-hexanediol

Further, EO and PO each represent an ethyleneoxy group and a propyleneoxy group.

As the alkylene oxide adduct of glycerin, commercially available products may be used. Examples of polyoxypropylated glycerin (ether of polypropylene glycol and glycerin) include SANNIX (registered trademark) GP-250 (average molecular weight of 250), GP-400 (average molecular weight of 400), GP-600 (average molecular weight of 600) [all manufactured by Sanyo Chemical Industries, Ltd.], LEOCON (registered trademark) GP-250 (average molecular weight of 250), GP-300 (average molecular weight of 300), GP-400 (average molecular weight of 400), GP-700 (average molecular weight of 700) [all manufactured by Lion Corporation], and a polypropylene triol glycol-triol type product (average molecular weight of 300, average molecular weight of 700) [manufactured by Wako Pure Chemical Industries, Ltd.].

—Solvent B—

The solvent B is at least one solvent selected from the group consisting of ethylene glycol, diethylene glycol, triethylene glycol, tetraethylene glycol (for example, PEG-200 described below), pentaethylene glycol, propylene glycol, and methyl propylene triglycol (MFTG). It is preferable that the solvent B contains at least one of triethylene glycol or tetraethylene glycol.

The solvent B may be a solvent formed of one solvent (single component) or a mixed solvent formed of two or more kinds of solvents.

As the solvent B, commercially available products may be used.

Examples thereof include PEG-200 (average molecular weight of 200), PEG-300 (average molecular weight of 300), and PEG-400 (average molecular weight of 400) [all manufactured by Sanyo Chemical Industries, Ltd.], PEG #200 (average molecular weight of 200), PEG #300 (average molecular weight of 300), and PEG #400 (average molecular weight of 400) [all manufactured by Lion Corporation], PEG #200 (average molecular weight of 200), PEG #300 (average molecular weight of 300), and PEG #400 (average molecular weight of 400) [all manufactured by NOF CORPORATION], and PEG200 (average molecular weight of 200), PEG300 (average molecular weight of 300), and PEG400 (average molecular weight of 400) [all manufactured by Dai-chi Kogyo Seiyaku Co., Ltd.].

(Surfactant)

The aqueous ink may contain at least one surfactant as necessary. The surfactant can be used as a surface tension adjuster.

As the surfactant, a compound having a structure that has both of a hydrophilic part and a hydrophobic part in a molecule can be effectively used, and any of an anionic surfactant, a cationic surfactant, an amphoteric surfactant, a non-ionic surfactant, or a betaine-based surfactant can be used. Further, the above-described polymer dispersant may be used as a surfactant.

From the viewpoint of suppressing jetting interference of the aqueous ink, a non-ionic surfactant is preferable as the surfactant. Among the examples of the non-ionic surfactant, an acetylene glycol derivative (acetylene glycol-based surfactant) is more preferable.

Examples of the acetylene glycol-based surfactant include 2,4,7,9-tetramethyl-5-decyne-4,7-diol and an alkylene oxide adduct of 2,4,7,9-tetramethyl-5-decyne-4,7-diol. It is preferable that the acetylene glycol-based surfactant is at least one selected from these. Examples of commercially available products of these compounds include E series of OLFINE E1010 (manufactured by Nissin Chemical Industry Co., Ltd.).

A fluorine-based surfactant is preferable as a surfactant other than the acetylene glycol-based surfactant. Examples of the fluorine-based surfactant include an anionic surfactant, a non-ionic surfactant, and a betaine-based surfactant. Among these, an anionic surfactant is more preferable. Examples of the anionic surfactant include CAPSTONE FS-63, CAPSTONE FS-61 (manufactured by Dupont), FTERGENT 100, FTERGENT 110, FTERGENT 150 (all manufactured by NEOS COMPANY LIMITED), and CHEMGUARD S-760P (manufactured by Chemguard Inc.).

In a case where the aqueous ink contains a surfactant (surface tension adjuster), from the viewpoint of satisfactorily jetting the aqueous ink according to the ink jet type, the amount of the surfactant to be contained in the aqueous ink is set such that the surface tension of the aqueous ink can be adjusted to be preferably in a range of 20 mN/m to 60 mN/m, more preferably in a range of 20 mN/m to 45 mN/m from the viewpoint of the surface tension, and still more preferably in a range of 25 mN/m to 40 mN/m.

Here, the surface tension of the aqueous ink indicates a value measured in a liquid temperature condition of 25° C. using an Automatic Surface Tensiometer CBVP-Z (manufactured by Kyowa Interface Science Co., Ltd.).

In a case where the aqueous ink contains a surfactant, the specific amount of the surfactant is not particularly limited, but is preferably 0.1% by mass or greater, more preferably in a range of 0.1% by mass to 10% by mass, and still more preferably in a range of 0.2% by mass to 3% by mass with respect to the total amount of the aqueous ink.

(Colloidal Silica)

The aqueous ink may contain colloidal silica as necessary.

In this manner, the stability during continuous jetting of the ink can be further improved.

The colloidal silica is a colloid formed of particles of an inorganic oxide that contains silicon having an average particle diameter of several hundreds of nanometers or less. The colloidal silica contains silicon dioxide (including the hydrate thereof) as a main component and may contain aluminate (such as sodium aluminate or potassium aluminate) as a small amount of component.

Further, the colloidal silica may contain inorganic salts such as sodium hydroxide, potassium hydroxide, lithium hydroxide, and ammonium hydroxide; and organic salts such as tetramethylammonium hydroxide. These inorganic salts and the organic salts act, for example, as a colloidal stabilizer.

In regard to the colloidal silica, for example, the description in paragraphs 0043 to 0050 of JP2011-202117A can be referred to.

Further, the aqueous ink may contain alkali silicate metal salts in place of or in addition to colloidal silica as necessary. In regard to the alkali silicate metal salts, the description in paragraphs 0052 to 0056 of JP2011-202117A can be referred to.

Further, commercially available products may be used and examples thereof include SNOWTEX (registered trademark) XS (manufactured by Nissan Chemical Industries, Ltd.).

In a case where the aqueous ink contains colloidal silica, the content of colloidal silica is preferably in a range of 0.0001% by mass to 10% by mass, more preferably in a range of 0.01% by mass to 3% by mass, still more preferably in a range of 0.02% by mass to 0.5% by mass, and particularly preferably in a range of 0.03% by mass to 0.3% by mass with respect to the total amount of the aqueous ink.

(Urea)

The aqueous ink may contain urea.

Since urea has an excellent moisturizing function, urea is capable of effectively suppressing undesired drying or solidification of the ink as a solid wetting agent.

In a case where the aqueous ink contains the colloidal silica and urea, the maintainability (wiping workability) of an ink jet head or the like is more effectively improved.

From the viewpoint of improving maintainability (wiping workability), the content of urea in the aqueous ink is preferably in a range of 1% by mass to 20% by mass, more preferably in a range of 1% by mass to 15% by mass, and still more preferably in a range of 3% by mass to 10% by mass.

In a case where the aqueous ink contains urea and colloidal silica, the ratio between the content of urea and the content of colloidal silica is not particularly limited, but the content ratio (urea/colloidal silica) of the content of urea to the content of colloidal silica is preferably in a range of 5 to 1000, more preferably in a range of 10 to 500, and still more preferably in a range of 20 to 200.

In the case where the aqueous ink contains urea and colloidal silica, a combination of the content of urea and the content of colloidal silica is not particularly limited, but the following combination is preferable from the viewpoint of improving the wiping properties.

That is, a combination of urea at a content of 1.0% by mass or greater and colloidal silica at a content of 0.01% by mass or greater is preferable; a combination of urea at a content of 1.0% by mass to 20% by mass and colloidal silica at a content of 0.02% by mass to 0.5% by mass is more preferable; and a combination of urea at a content of 3.0% by mass to 10% by mass and colloidal silica at a content of 0.03% by mass 0.3% by mass is particularly preferable.

(Water-soluble Polymer Compound)

The aqueous ink contains at least one water-soluble polymer compound as necessary.

The water-soluble polymer compound is not particularly limited, and known water-soluble polymer compounds such as polyvinyl alcohol, polyacrylamide, polyvinylpyrrolidone, and polyethylene glycol can be used.

Further, as the water-soluble polymer compounds, water-soluble polymer compounds described in paragraphs 0026 to 0080 of JP2013-001854A are exemplified.

Further, commercially available products may be used and examples thereof include PVP K-15 (manufactured by ISB CORPORATION).

In a case where the aqueous ink contains a water-soluble polymer compound, the content of the water-soluble polymer compound is preferably in a range of 0.0001% by mass to 10% by mass, more preferably in a range of 0.01% by mass to 3% by mass, still more preferably in a range of 0.02% by mass to 0.5% by mass, and particularly preferably in a range of 0.03% by mass to 0.3% by mass with respect to the total amount of the aqueous ink.

(Anti-foaming Agent)

The aqueous ink may contain at least one anti-foaming agent as necessary.

Examples of the anti-foaming agent include a silicone-based compound (a silicone-based anti-foaming agent) and a pluronic compound (pluronic anti-foaming agent). Among these, a silicone-based anti-foaming agent is preferable.

As the silicone-based anti-foaming agent, a silicone-based anti-foaming agent having a polysiloxane structure is preferable.

As the anti-foaming agent, commercially available products can be used.

Examples of the commercially available products include BYK (registered trademark)-012, 017, 021, 022, 024, 025, 038, and 094 (all manufactured by manufactured by Big Chemie Japan Co., Ltd.); KS-537, KS-604, KM-72F (all manufactured by Shin-Etsu Chemical Co., Ltd.); TSA-739 (manufactured by Momentive Performance Material Inc.), and OLFINE (registered trademark) AF104 (manufactured by Nissin Chemical Industry Co., Ltd.).

Among these, BYK-017, 021, 022, 024, 025, 094, KS-537, KS-604, KM-72F, and TSA-739 serving as a silicone-based anti-foaming agent are preferable. Among these, from the viewpoint of jetting stability of an ink, BYK-024 is most preferable.

In a case where the aqueous ink contains an anti-foaming agent, the content of the anti-foaming agent is preferably in a range of 0.0001% by mass to 1% by mass and more preferably in a range of 0.001% by mass to 0.1% by mass with respect to the total amount of the aqueous ink.

(Wax Particles)

The aqueous ink may contain at least one kind of wax particles. In this manner, the rub resistance can be further improved.

Examples of wax particles include a plant-based wax such as carnauba wax, candelilla wax, beeswax, rice wax, or lanolin, an animal wax, a petroleum-based wax such as paraffin wax, microcrystalline wax, polyethylene wax, polyethylene oxide wax, or petrolatum, a mineral wax such as montan wax or ozokerite, a synthetic wax such as carbon wax, hoechst wax, polyolefin wax, or stearic acid amide, a natural wax such as an α-olefin-maleic anhydride copolymer, particles of a synthetic wax, and mixed particles of these.

It is preferable that the wax particles are added in the form of a dispersion. For example, the aqueous ink contains the wax as a dispersion such as an emulsion. It is preferable that the vehicle in a case where the wax is contained in the aqueous ink as a dispersion is water, but the vehicle is not limited thereto. For example, the vehicle may be appropriately selected from organic vehicles which have been typically used and can be used during the dispersion. In regard to the organic vehicles, the description of paragraph 0027 of JP2006-91780A can be referred to.

The wax particles may be used alone or by mixing plural kinds thereof.

As the wax particles, commercially available products may be used. Examples of the commercially available products include NOPCOAT PEM17 (manufactured by SAN NOPCO LIMITED), CHEMIPEARL (registered trademark) W4005 (manufactured by Mitsui Chemicals, Inc.), AQUACER 515 and AQUACER 593 (both manufactured by Big Chemie Japan Co., Ltd.), and SELOSOL 524 (manufactured by CHUKYO YUSHI CO., LTD.).

Among these, carnauba wax or polyolefin wax is preferable as the wax, and carnauba wax is particularly preferable from the viewpoint of rub resistance.

In a case where the aqueous ink contains wax particles, the ratio of the content of resin particles to the content of wax particles (resin particles:wax particles) is preferably in a range of 1:5 to 5:1 (ratio between solid contents). In a case where the ratio of the content of resin particles to the content of wax particles is in the above-described range, an image having excellent rub resistance can be formed.

(Other Components)

The aqueous ink may contain other components in addition to the above-described components as necessary.

Examples of other components include known additives such as a solid wetting agent, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

The aqueous ink may be active energy ray (for example, ultraviolet ray) curable aqueous ink that contains at least one polymerizable compound.

In this case, it is preferable that the aqueous ink further contains a polymerization initiator.

Examples of the polymerizable compound include polymerizable compounds (for example, a bi- or higher functional (meth)acrylamide compound) described in paragraphs 0128 to 0144 of JP2011-184628A, paragraphs 0019 to 0034 of JP2011-178896A, and paragraphs 0065 to 0086 of JP2015-25076A.

Examples of the polymerization initiator include known polymerization initiators described in paragraphs 0186 to 0190 of JP2011-184628A, paragraphs 0126 to 0130 of JP2011-178896A, and paragraphs 0041 to 0064 of JP2015-25076A.

~Ink Jet Type~

Next, a method of forming an image using the lenticular sheet and the aqueous ink described above according to the ink jet type will be described in detail.

The ink jet type is not particularly limited, and any of known methods such as an electric charge control method of jetting an ink using electrostatic attraction force; a drop-on-demand method (pressure pulse method) using a vibration pressure of a piezoelectric element; an acoustic ink jet type of jetting an ink using a radiation pressure by changing an electric signal into an acoustic beam and radiating the acoustic beam to the ink; and a thermal ink jet (bubble jet (registered trademark)) method of heating an ink to form bubbles and utilizing the generated pressure may be used. As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

A short serial head is used as the ink jet head, and there are two types for the ink jet head, which are a shuttle type of performing recording while scanning a head in the width direction of the lenticular sheet and a single pass type (line type) of using a line head in which recording elements are arranged corresponding to the entire area of one side of the lenticular sheet. In the single pass type, image recording can be performed on the entire surface of the lenticular sheet by scanning the lenticular sheet in a direction intersecting the direction in which the recording elements are arranged. Therefore, a transport type such as a carriage that scans a short head becomes unnecessary. Further, since complicated scanning control between movement of a carriage and the lenticular sheet become unnecessary and only the lenticular sheet moves, the recording can be performed at a higher speed compared to the shuttle type. The method of forming a parallax picture using the ink jet type in the production method of the present invention can be applied to any of these, but it is preferable that the method is applied to the single pass type that does not perform a dummy jet since the jetting accuracy and the rub resistance of an image are highly improved and drawing can be performed at a high speed.

From the viewpoint of forming a high-definition parallax picture, the amount of liquid droplets of ink jetted from the ink jet heads is preferably in a range of 1 pl (pico liter) to 10 pl, more preferably in a range of 1.5 pl to 6 pl, and still more preferably in a range of 1.5 pl to 3 pl. From the viewpoints of improving connection of continuous gradations, it is also advantageous that the ink is jetted by combining a different amount of liquid droplets, and the present invention can be suitably used even in this case.

Further, from the viewpoint of forming a high-resolution parallax picture, it is preferable that the aqueous ink is jetted at a resolution of 1200 dpi×1200 dpi (dot per inch) or greater.

Particularly, from the viewpoint of obtaining the productivity of the lenticular printed material and a high-definition parallax picture, it is preferable that the ink jet type is a single pass type and the aqueous ink is jetted under a jetting condition of a resolution of 1200 dpi×1200 dpi or greater.

Further, from the viewpoint of obtaining a high-definition parallax picture, it is preferable that the aqueous ink is jetted under a jetting condition of a minimum liquid droplet size of 3 pl or less.

As the ink jet recording device which is capable of jetting the aqueous ink under the above-described jetting conditions, Jet Press (registered trademark) 720 (manufactured by Fujifilm Corporation) can be suitably used.

<Drying Step>

The method of producing a lenticular printed material includes a drying step of drying the aqueous ink under a condition in which the surface temperature of the ink receiving layer of the lenticular sheet is 30° C. or higher to form a parallax picture.

The drying step is performed for the purpose of removing at least some (preferably all) water mainly in the aqueous ink, and the water-soluble high boiling point solvent in the aqueous ink may remain in the ink receiving layer after the drying step.

By drying the aqueous ink under a condition in which the surface temperature of the ink receiving layer in the drying step is 30° C. or higher, the water in the aqueous ink is unlikely to remain after the drying of the aqueous ink and the fixing property of the parallax picture becomes excellent.

The surface temperature can be measured using a handy radiation thermometer IT-540N (manufactured by HORIBA, Ltd.).

~Drying Method~

It is preferable that the aqueous ink is heated and dried in the drying step.

Examples of the means for performing heating and drying include known heating means using a heater or the like, known blast means using a dryer or the like, and means combining these means.

Examples of the method for performing heating and drying include a method of applying warm or hot air to a surface of the lenticular sheet on which an ink receiving layer is formed; a method of applying heat using an infrared heater from a surface of the lenticular sheet on which an ink receiving layer is formed; and a method of combining a plurality of these methods.

The heating temperature of heating and drying an image is a temperature to be set such that the surface temperature of the ink receiving layer is 30° C. or greater, more preferably in a range of 30° C. to 100° C., and still more preferably in a range of 60° C. to 80° C.

The time for heating and drying the image is not particularly limited, but is preferably in a range of 1 second to 60 seconds, more preferably in a range of 1 second to 30 seconds, and particularly preferably in a range of 1 second to 20 seconds.

<Position Correcting Step>

The method of producing a lenticular printed material includes a position correcting step of correcting a position for jetting the aqueous ink to be jetted to the ink receiving layer based on position information of the parallax picture on the lens layer.

In a case where the method of producing a lenticular printed material includes the position correcting step, the position of the parallax picture on the lens layer can be easily corrected. Therefore, the operation time for positioning in the method of obtaining a lenticular printed material by bonding paper of the related art, on which a parallax picture has been formed, to the lenticular sheet can be significantly reduced, and thus the productivity is further improved.

In a case where the lenticular printed material is continuously produced, the position accuracy of the parallax picture is improved so that the image switching properties are further improved in the next jetting step by providing the position correcting step.

Further, since the correction is performed based on digital position information in the position correcting step, the position can be deviated by one dot row (for example, by 20 µm in a case where the resolution is 1200 dpi×1200 dpi), and positioning can be made with high accuracy.

Specifically, the position correcting step can be performed according to the following method.

First, the position information of the pitch of the lens layer and the position information of the parallax picture are acquired using a sensor (sensor 1) that detects position information of the pitch of the lens layer of the lenticular sheet and a sensor (sensor 2) that detects position information of the parallax picture formed by performing the above-described drying step.

Next, based on the position information of the obtained lens layer and the position information of the parallax picture, deviation therebetween is calculated by calculation means.

Further, based on the calculation results, the position for jetting the ink to be jetted according to the ink jet type is controlled in the next jetting step and the position of the parallax picture to be formed on the ink receiving layer of the lenticular sheet is corrected.

The sensor 1 and the sensor 2 are not particularly limited as long as the sensors are capable of detecting position information, but optical sensors are preferable from the viewpoint of the accuracy of position information to be detected. Further, the sensor 1 and the sensor 2 may be of a shuttle type of acquiring position information while scanning the sensors in a width direction or a transport direction of the lenticular sheet or a line type in which the sensors are arranged corresponding to the entire region of one side of the lenticular sheet.

The calculation means is not particularly limited as long as the deviation between the position information of the pitch of the lens layer and the position information of the parallax picture can be calculated.

~Ink Jet Recording Device~

Here, an example of an ink jet recording device which can be used for the method of producing a lenticular printed material will be described.

(Overall Configuration of Ink Jet Recording Device)

Figure 2:
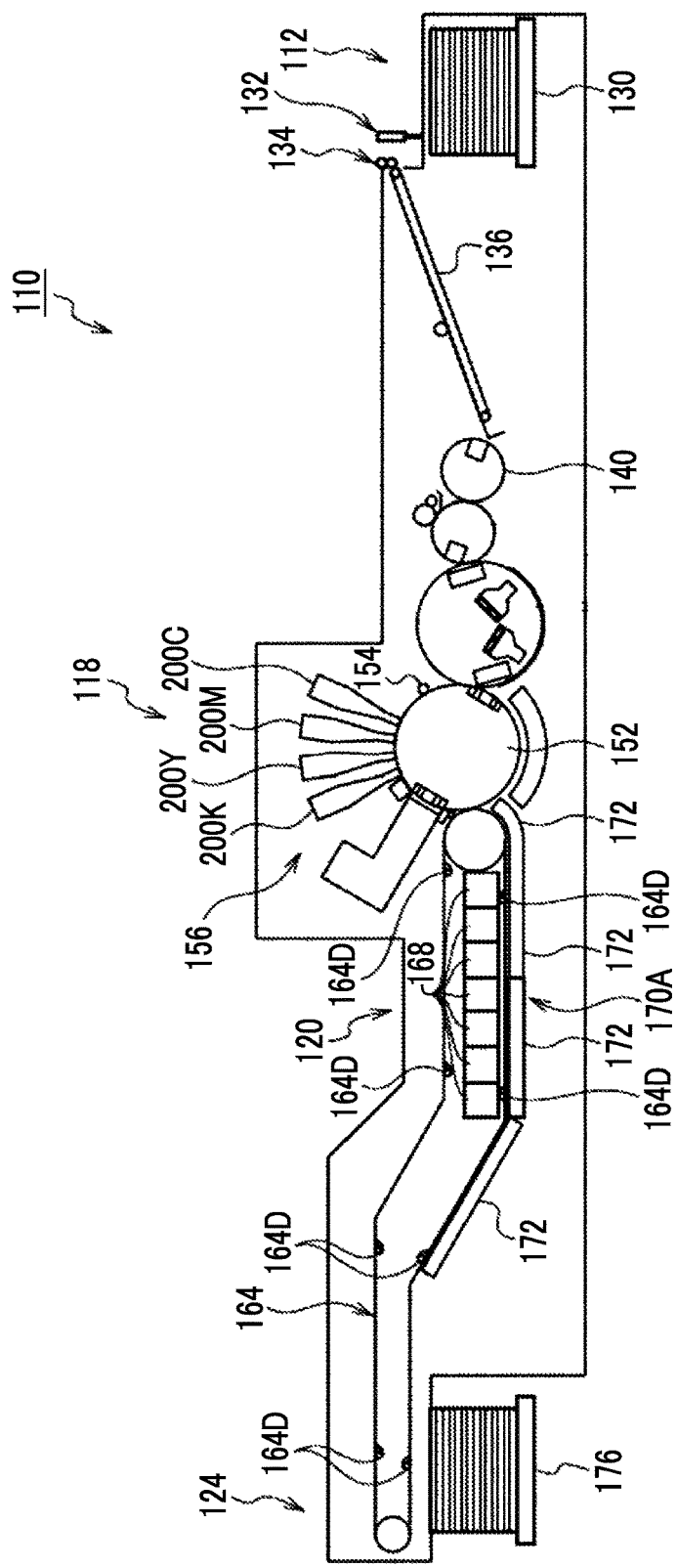
FIG. 2 is a schematic view illustrating an example of an overall configuration of an ink jet recording device.

First, the overall configuration of the ink jet recording device will be described. FIG. 2 is an overall configuration view schematically illustrating the overall configuration of the ink jet recording device.

An ink jet recording device 110 records images by jetting four colors of inks, which are, a cyan (C) ink, a magenta (M) ink, a yellow (Y) ink, and a black (K) ink, to a recording medium.

The above-described lenticular sheet is used as the recording medium. Further, the above-described aqueous ink is used as the ink.

As illustrated in FIG. 2, the ink jet recording device 110 mainly includes a supply unit 112 which supplies the lenticular sheet; an image recording unit 118 which draws an image by jetting an aqueous ink onto the ink receiving layer of the lenticular sheet supplied from the supply unit 112 according to the ink jet type; an ink drying treatment unit 120 which performs the drying treatment on the lenticular sheet on which the image has been recorded; and a discharge unit 124 which discharges and recovers the lenticular sheet.

—Supply Unit—

The supply unit 112 supplies the lenticular sheet stacked on a supply stand 130 one by one to the image recording unit 118. The supply unit 112 mainly includes the supply stand 130, a sucker device 132, a pair of supply rollers 134, a feeder board 136, and a supply drum 140.

—Image Recording Unit—

The image recording unit 118 draws an image on the ink receiving layer of the lenticular sheet by jetting aqueous inks (for example, a cyan ink (C), a magenta ink (M), a yellow ink (Y), and a black ink (K)) to the surface of the lenticular sheet. The image recording unit 118 mainly includes an image recording drum 152 which transports the lenticular sheet; a base material-pressing roller 154 which presses the lenticular sheet to be transported by the image recording drum 152 and brings the lenticular sheet into close contact with the peripheral surface of the image recording drum 152; and a head unit 156 which records an image by jetting respective colors of C, M, Y, and K ink droplets to the lenticular sheet.

The head unit 156 includes an ink jet head 200C which jets cyan (C) ink droplets according to the ink jet type; an ink jet head 200M which jets magenta (M) ink droplets according to the ink jet type; an ink jet head 200Y which jets yellow (Y) ink droplets according to the ink jet type; and an ink jet head 200K which jets black (K) ink droplets according to the ink jet type. The respective ink jet heads 200C, 200M, 200Y, and 200K are disposed at constant intervals along the transport path of the lenticular sheet transported by the image recording drum 152.

The respective ink jet heads 200C, 200M, 200Y, and 200K include a line head and are formed to have a length corresponding to the maximum lenticular sheet width. The respective ink jet heads 200C, 200M, 200Y, and 200K are disposed such that a nozzle surface (surface on which nozzles are arranged) faces the peripheral surface of the image recording drum 152.

The respective ink jet heads 200C, 200M, 200Y, and 200K record an image on the ink receiving layer of the lenticular sheet to be transported by the image recording drum 152 by the nozzles, formed on the nozzle surface, jetting liquid droplets of inks toward the image recording drum 152.

—Ink Drying Treatment Unit—

The ink drying treatment unit 120 performs the drying treatment on the lenticular sheet after the image recording and removes liquid components (mainly water) remaining on the ink receiving layer of the lenticular sheet. The ink drying treatment unit 120 includes a transport unit 164 which transports the lenticular sheet on which an image has been recorded; and an ink drying treatment unit 168 which performs the drying treatment on the lenticular sheet to be transported by the transport unit 164.

The ink drying treatment unit 168 is provided inside the transport unit 164 and performs the drying treatment on the lenticular sheet to be transported through a first horizontal transport path 170A. The ink drying treatment unit 168 performs the drying treatment by blowing hot air to the surface of the ink receiving layer of the lenticular sheet to be transported through the first horizontal transport path 170A. A plurality of the ink drying treatment units 168 are disposed along the first horizontal transport path 170A. The number of ink drying treatment units to be provided is set according to the treatment capacity of the ink drying treatment unit 168, the transport speed (printing speed) of the lenticular sheet, or the like. In other words, the number of ink drying treatment units is set such that the lenticular sheet received from the image recording unit 118 is dried while being transported through the first horizontal transport path 170A. Accordingly, the length of the first horizontal transport path 170A is also set in consideration of the capacity of the ink drying treatment unit 168.

In addition, the humidity of the ink drying treatment unit 120 is increased by performing the drying treatment. In a case where the humidity thereof is increased, since the drying treatment cannot be efficiently performed, it is preferable that the ink drying treatment unit 168 and exhaust means are provided in the ink drying treatment unit 120 and humid air generated by the drying treatment is forcibly exhausted. The exhaust means can be configured such that an exhaust duct is provided in the ink drying treatment unit 120 and the air of the ink drying treatment unit 120 is exhausted by the exhaust duct.

The lenticular sheet delivered from the image recording drum 152 of the image recording unit 118 is received by the transport unit 164. The transport unit 164 transports the lenticular sheet along with the planar guide plate 172 by allowing a gripper 164D to grip the front end of the lenticular sheet. The lenticular sheet delivered to the transport unit 164 is firstly transported to the first horizontal transport path 170A. During the transport of the lenticular sheet through the first horizontal transport path 170A, the drying treatment is performed on the lenticular sheet by the ink drying treatment unit 168 provided inside the transport unit 164. In other words, the drying treatment is performed under conditions in which hot air is blown to the ink receiving layer of the lenticular sheet and the surface temperature of the ink receiving layer is 30° C. or higher.

The ink drying treatment unit can perform the drying treatment and an ink fixing treatment. The ink fixing treatment is performed by blowing hot air to the ink receiving layer of the lenticular sheet to be transported through the first horizontal transport path similar to the drying treatment described above. The ink fixing treatment is performed under a condition in which the surface temperature of the ink receiving layer is 30° C. or higher.

—Discharge Unit—

The discharge unit 124 discharges the lenticular sheet on which a series of image recording treatments have been performed and then recovers the lenticular sheet. The discharge unit 124 mainly includes the transport unit 164 which transports the lenticular sheet and a discharge stand 176 which recovers the lenticular sheet by stacking the lenticular sheets.

<<Lenticular Sheet>>

The lenticular sheet includes a resin layer, a lens layer disposed on one surface side of the resin layer, and an ink receiving layer which is disposed on the other surface side of the resin layer, contains particles and a resin, and has a porous structure and a void volume of 50% or greater.

The lenticular sheet can be suitably used for the method of producing the lenticular printed material and has excellent productivity because the lenticular printed material is produced using the lenticular sheet of the present invention.

The specific and preferred aspects of the resin layer, the lens layer, and the ink receiving layer of the lenticular sheet are as described above.

<<Lenticular Printed Material>>

The lenticular printed material has a parallax picture formed on the ink receiving layer of the lenticular sheet of the present invention using the aqueous ink that contains a colorant, resin particles, water, and a water-soluble high boiling point solvent. The specific and preferred aspects of the colorant, the resin particles, the water, and the water-soluble high boiling point solvent are as described above.

The lenticular printed material can be produced according to the method of producing the lenticular printed material of the present invention.

EXAMPLES

Hereinafter, the present invention will be described in more detail with reference to examples. The materials, the use amounts, the ratios, the treatment contents, and the treatment procedures shown in the examples described below can be changed as appropriate within the range not departing from the gist of the present invention. Therefore, the scope of the present invention is not limited to the specific examples shown below.

In the description below, "part" indicates "part by mass" unless otherwise noted.

Example 1

<Lenticular Sheet 1>

—Preparation of Resin Layer—

Polyethylene terephthalate (hereinafter, referred to as "PET") having an intrinsic viscosity of 0.64 dL/g obtained by polycondensing a titanium compound used as a catalyst was dried until the moisture content was set to 50 ppm or less. The dried PET was melted in an extruder having a heater temperature which was set to be in a range of 280° C. to 300° C. The melted PET was extruded on a chill roll electrostatically applied from a die portion, thereby obtaining a band-like unstretched PET film. The obtained band-like unstretched PET film was stretched at a stretch ratio of 3.3 times in the longitudinal direction (hereinafter, the "longitudinal direction" is referred to as a "machine direction (MD)"), thereby obtaining a band-like uniaxially stretched PET film.

The obtained uniaxially stretched PET film was stretched at a stretching ratio of 4.0 times in the width direction (direction orthogonal to the stretching direction in the uniaxially stretched PET film, also referred to as a "transverse direction (TD)") using a stretching device, thereby obtaining a biaxially stretched PET film (resin layer) having a thickness of 250 μm.

—Formation of Lens Layer—

An interlayer and a lens layer were formed on one surface of the biaxially stretched PET film (resin layer) prepared in the above-described manner, according to the following procedures.

A glycol-modified polyethylene terephthalate (PET-G) resin (manufactured by SK Chemicals Co., Ltd.) for forming a lens layer and a resin (ADMER (registered trademark), manufactured by Mitsui Chemicals Inc.) for forming an interlayer were coextruded on one surface of the biaxially stretched PET film at an actually measured resin temperature of 260° C. to 280° C. using a T die (jetting width of 330 mm) whose temperature was set to 280° C., and the biaxially stretched PET film, the interlayer, and the PET-G layer for forming a lens configuration were laminated to have a layer structure in this order so that a laminate was obtained. This laminate was transported at 20 m/min and allowed to pass through a space between an embossing roller and a nip roller (φ350 mm, 40° C.) such that the embossing roller (φ350 mm, 40° C.) was brought into the contact with the surface on which the glycol-modified polyethylene terephthalate for forming a lens layer was laminated. The surface of the embossing roller has a lenticular lens shape (radius of 150 μm, lens pitch of 254 μm, 100 LPI; Lens per inch; the number of lenses per 1 inch: 100).

A lens layer was formed, through the interlayer, on the biaxially stretched PET film which had passed through the space between the embossing roller and the nip roller. The thickness of the obtained laminate was 350 μm.

—Preparation of Coating Solution 1 for Ink Receiving Layer—

Gas phase method silica particles (a), ion exchange water (b), SHALLOL DC-902P (c), and ZA-30 (d) in the following composition were mixed, pre-dispersed using a homomixer, and further dispersed at 170 MPa in one pass using a liquid-liquid collision type disperser such as ULTIMIZER (manufactured by SUGINO MACHINE LIMITED CO., LTD.). This dispersion liquid was heated to 45° C. and held for 20 hours. A boric acid aqueous solution (e), a polyvinyl alcohol-dissolved solution (f), SUPERFLEX 650 (g), EMULGEN 109P (h), and ethanol (i) in the following composition were further added to the dispersion liquid at 30° C. to prepare a coating solution 1 for an ink receiving layer. At this time, the mass ratio [PB ratio=gas phase method silica particles/(polyvinyl alcohol+urethane resin)] between the particles and the resin was 3.0, and the pH of the prepared coating solution for forming an ink receiving layer 1 was 3.9, which exhibited acidity.

~Composition of Coating Solution 1 for Forming Ink Receiving Layer~

| | |
|---|---|
| (a) AEROSIL 300S F75 | 10.0 parts |
| [gas phase method silica particles, manufactured by Nippon Aerosil Co., Ltd., average primary particle diameter of 7 nm] | |
| (b) Ion exchange water | 64.8 parts |
| (c) SHALLOL DC-902P | 0.87 parts |
| [mordant, cationic polymer compound, manufactured by DIC Corporation, 51.5 mass % aqueous solution] | |
| (d) ZIRCOSOL ZA-30 | 0.49 parts |
| [manufactured by Daiichi Kigenso Kagaku Kogyo Co., Ltd.] | |
| (e) Boric acid aqueous solution | 0.40 parts |
| [Crosslinking agent, 5 mass % aqueous solution] | |
| (f) Polyvinyl alcohol-dissolved solution | 32.0 parts |
| [the following composition] | |
| (g) SUPERFLEX 650 | 1.2 parts |
| [resin, urethane resin, manufactured by DIC Corporation] | |
| (h) EMULGEN 109P | 0.49 parts |
| [surfactant, polyoxyethylene lauryl ether, 10 mass % aqueous solution, HLB value of 13.6, manufactured by Kao Corporation] | |
| (i) Ethanol | 2.5 parts |
| ~ Composition of polyvinyl alcohol-dissolved solution ~ | |
| PVA-235 | 2.0 parts |
| [resin, polyvinyl alcohol, manufactured by Kuraray Co., Ltd, saponification degree of 88%, degree of polymerization of 3500] | |
| EMULGEN 109P | 0.03 parts |
| [surfactant, polyoxyethylene lauryl ether, manufactured by Kao Corporation] | |
| Compound 1 shown below | 0.12 parts |
| BUTYCENOL 20P | 0.55 parts |
| [diethylene glycol monobutyl ether, manufactured by KH Neochem Co., Ltd.] | |
| Ion exchange water | 26.6 parts |

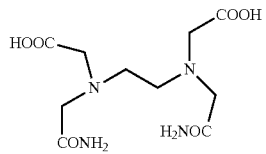

Compound 1

—Formation of Ink Receiving Layer—

After a surface side of the resin layer, in the laminate (the resin layer+the lens layer) obtained in the above-described manner, opposite to a side where the lens layer was provided was subjected to a corona discharge treatment, this surface was coated with the coating solution 1 for forming an ink receiving layer such that the thickness of the dried layer (dried layer thickness) was set to 15 μm. Next, the coating solution was dried at 80° C. using a hot air dryer (wind speed of 3 m/sec to 8 m/sec) for 10 minutes. As described above, a lenticular sheet 1 including a lens layer provided on one surface side of the resin layer and an ink receiving layer having a dried layer thickness of 15 μm provided on the other surface side of the resin layer (on the surface side opposite to the side where the lens layer was provided) was prepared.

The void volume of the ink receiving layer of the obtained lenticular sheet 1 was measured and the value was 55%. The void volume was measured using a mercury porosimeter ("PORE SIZER 9320-PC2" (trade name), manufactured by Shimadzu Corporation) according to a mercury press-in method.

The light transmittance of the ink receiving layer of the obtained lenticular sheet 1 was measured and the value was 90%. The light transmittance was measured using an ultraviolet-visible-near infrared spectrophotometer V570 (manufactured by JASCO Corporation).

Further, the lenticular sheet 1 was cut into a half-kikuban (636 mm×469 mm) size and then used.

<Aqueous Ink>

(Synthesis of Self-dispersing Polymer Particles P-1 (Resin Particles))

360.0 g of methyl ethyl ketone was put into a 2 L three-neck flask provided with a stirrer, a thermometer, a reflux cooling pipe, and a nitrogen gas introduction pipe and then heated to 75° C. Thereafter, a mixed solution was prepared by mixing 72.0 g of isobornyl methacrylate, 252.0 g of methyl methacrylate, 36.0 g of methacrylic acid, 72 g of methyl ethyl ketone, and 1.44 g of "V-601" (polymerization initiator, manufactured by Wako Pure Chemical Industries, Ltd., compound name: (dimethyl 2,2'-azobis(2-methylpropionate)) in another container. The mixed solution prepared in the above-described manner was added dropwise at a constant speed such that the dropwise addition was completed for 2 hours while the temperature in the flask into which methyl ethyl ketone was put was maintained to 75° C. A solution formed of 0.72 g of "V-601" and 36.0 g of methyl ethyl ketone was added thereto after the dropwise addition was completed, and a solution formed of 0.72 g of "V-601" and 36.0 g of isopropanol was added thereto after the solution was stirred at 75° C. for 2 hours, and then the solution was stirred at 75° C. for 2 hours. Thereafter, the solution was heated to 85° C. and continuously stirred for 2 hours, thereby obtaining a polymer solution of an isobornyl methacrylate/methyl methacrylate/methacrylic acid (20/70/10 [mass ratio]) copolymer.

The weight-average molecular weight (Mw) of the obtained copolymer was measured according to the following method, and the value thereof was $6.0\times10^4$. Further, the acid value of the obtained copolymer was measured, and the value thereof was 64.9 mgKOH/g.

—Measurement of Weight-Average Molecular Weight—

The weight-average molecular weight is measured by gel permeation chromatography (GPC).

The GPC was performed using HLC-8020GPC (manufactured by TOSOH CORPORATION), three columns of TSKgel (registered trademark), and Super Multipore HZ-H (manufactured by TOSOH CORPORATION, 4.6 mmID×15 cm), and tetrahydrofuran (THF) as an eluent.

Further, the GPC is performed at a sample concentration of 0.45% by mass, a flow rate of 0.35 ml/min, a sample injection volume of 10 µl, and a measurement temperature of 40° C. using a differential refractive index (RI) detector.

The calibration curve was prepared using 8 samples of "F-40", "F-20", "F-4", "F-1", "A-5000", "A-2500", "A-1000", and "n-propylbenzene" which are "Standard Samples TSK standard, polystyrene" (manufactured by TOSOH CORPORATION).

—Measurement of Acid Value—

The acid value is represented by the number of moles of potassium hydroxide necessary for neutralizing 1 gram (g) of resin particles, and a value acquired using a measuring method in conformity with JIS Standard (JIS K0070:1992).

Next, 668.3 g of the obtained polymer solution was weighed, 388.3 g of isopropanol and 145.7 ml of a 1 mol/L sodium hydroxide aqueous solution were added to the solution, and the temperature in the reaction container was increased to 80° C. Thereafter, 720.1 g of distilled water was added dropwise thereto at a speed of 20 ml/min and dispersed in the solution, and the temperature in the reaction container was maintained at 80° C. for 2 hours, 85° C. for 2 hours, and then 90° C. for 2 hours under atmospheric pressure. Thereafter, the pressure inside the reaction container was reduced, and a total amount of 913.7 g of isopropanol, methyl ethyl ketone, and distilled water were distilled off, thereby obtaining an aqueous dispersion of self-dispersing polymer particles P-1 (resin particles) having a concentration of solid contents (concentration of polymer particles) of 28.0% by mass.

The glass transition temperature (Tg) of the self-dispersing polymer particles P-1 was measured according to the following method, and the temperature was 145° C.

—Measurement of Glass Transition Temperature (Tg)—

0.5 g of the aqueous dispersion of self-dispersing polymer particles in solid content was dried at 50° C. for 4 hours under reduced pressure, thereby obtaining a polymer solid content. The Tg of the obtained polymer solid content was measured using a differential scanning calorimeter (DSC) EXSTAR6220 (manufactured by Hitachi High-Tech Science Corporation). Specifically, 5 mg of the polymer solid content was sealed by an aluminum pan, the temperature of the polymer solid content was changed according to the following temperature profile in a nitrogen atmosphere, and then the Tg was acquired based on the data obtained by measurement at the time of the second temperature increase. Further, the melting point was not observed within the range of the following temperature profile.

—Temperature Profile in Measurement of Tg of Resin Particles—

30° C.→−50° C. (cooling at 50° C./min)
−50° C.→220° C. (heating at 20° C./min)
220° C.→−50° C. (cooling at 50° C./min)
−50° C.→220° C. (heating at 20° C./min)

(Preparation of Cyan Ink)

The solution obtained by mixing components shown in the composition of a cyan ink described below was stirred at a rotation speed of 5000 rotations per minute at room temperature for 20 minutes using a mixer (L4R, manufactured by Silverson Machines, Inc.), thereby preparing a cyan ink.

The viscosity of the prepared cyan ink was measured using VISCOMETER TV-22 (manufactured by TOKI SANGYO CO., LTD.) and the value thereof was 6 mPa·s at 30° C.

The surface tension of the prepared cyan ink was measured using Automatic Surface Tensiometer CBVP-Z (manufactured by Kyowa Interface Science Co., Ltd.) and the value thereof was 38 mN/m at 25° C.

The viscosities and the surface tensions of other inks described below were measured according to the same method used for those of the cyan ink.

—Composition of Cyan Ink—

| | |
|---|---|
| Cyan pigment dispersion (dispersion of colorant, Project Cyan APD 3000, manufactured by Fujifilm Imaging Colorants Inc., pigment concentration of 14% by mass) | 18% by mass |
| Glycerin (water-soluble high boiling point solvent, manufactured by Wako Pure Chemical Industries, Ltd., boiling point of 290° C.) | 8% by mass |
| Polyethylene glycol monomethyl ether (water-soluble high boiling point solvent, HIMOL PM, manufactured by TOHO Chemical Industry Co., Ltd., boiling point of 290° C. to 310° C.) | 8% by mass |
| OLFINE (registered trademark) E1010 (manufactured by Nissin Chemical Industry Co., Ltd., surfactant) | 0.3% by mass |
| Self-dispersing polymer particles P-1 (resin particles) | 8% by mass |
| PVPK-15 (manufactured by ISB CORPORATION) | 0.2% by mass |

| | |
|---|---|
| Urea | 5% by mass |
| SELOSOL 524 (manufactured by CHUKYO YUSHI CO., LTD.) | 3% by mass |
| Lithium chloride | 0.01% by mass |
| SNOWTEX (registered trademark) XS (colloidal silica, manufactured by Nissan Chemical Industries, Ltd.) | 0.3% by mass |
| CAPSTONE (registered trademark) FS-63 (surfactant, manufactured by Dupont) | 0.01% by mass |
| BYK (registered trademark)-024 (anti-foaming agent, manufactured by Big Chemie Japan Co., Ltd.) | 0.01% by mass |
| Ion exchange water | residual amount of 100% by mass in total |

A magenta ink, a yellow ink, and a black ink were prepared in the same manner as in the preparation of the cyan ink except that the type and the amount of the cyan pigment dispersion used for preparing the cyan ink was changed to the type and the amount of a pigment dispersion shown below.

The viscosity of the prepared magenta ink was 6 mPa·s and the surface tension thereof was 38 mN/m.

The viscosity of the prepared yellow ink was 6 mPa·s and the surface tension thereof was 38 mN/m.

The viscosity of the prepared black ink was 6 mPa·s and the surface tension thereof was 38 mN/m.

| Magenta ink | |
|---|---|
| Magenta pigment dispersion (dispersion of colorant, Project Magenta APD 3000, manufactured by Fujifilm Imaging Colorants Inc., pigment concentration of 14% by mass) | 40% by mass |
| Yellow ink | |
| Yellow pigment dispersion (dispersion of colorant, Project Yellow APD 3000: manufactured by Fujifilm Imaging Colorants Inc., pigment concentration of 14% by mass) | 25% by mass |
| Black ink | |
| Black pigment dispersion (dispersion of colorant, Project Black APD 3000: manufactured by Fujifilm Imaging Colorants Inc., pigment concentration of 14% by mass) | 21% by mass |

<Conditions for Forming Images>

Jet Press (registered trademark) 720 (manufactured by Fujifilm Corporation) was used as a printer. The specification and the printing conditions for Jet Press (registered trademark) 720 are described below.

Drawing type: single pass drawing

Image forming speed: 2880 sheets/hr (linear speed: 30 m/min)

Resolution: 1200 dpi×1200 dpi

Volume of ink liquid droplets

Small droplets: 2 pl, medium droplets: 7 pl, large droplets: 10 pl

Printing system impression cylinder transport system 1) an image recording unit and 2) an ink drying treatment unit are respectively disposed on three impression cylinders from the upstream side. The order of each step is 1) an ink recording step and 2) a drying and fixing step from the upstream side.

Drying conditions

Cylinder temperature: 70° C., hot air and carbon heater: 70° C., ink receiving layer surface temperature: 50° C.

Fixing temperature

Cylinder temperature: 45° C., hot air: 70° C., ink receiving layer surface temperature: 50° C.

Materials to be used

Aqueous ink: yellow ink, magenta ink, cyan ink, and black ink described above

The yellow ink, the magenta ink, the cyan ink, and the black ink were jetted to the ink receiving layer of the lenticular sheet 1 using the above-described device through a raster image processor (RIP) XMF (manufactured by Fujifilm Corporation) of Jet Press (registered trademark), and the ink receiving layer was dried under the above-described drying conditions. In this manner, a lenticular printed material 1 provided with an image (parallax picture), in which the display content was switched depending on the viewing direction, on the ink receiving layer of the lenticular sheet 1 having a size of 636 mm×469 mm was obtained.

In a case where the ink receiving layer was allowed to pass through RIP of Jet Press (registered trademark), small droplets were used on a low density side and the proportion of medium droplets was increased as the density became higher.

<Formation of Parallax Picture>

As a parallax picture, two images for display with the common background and different characters to be displayed; and an image having the common image formed of only the background common to the two images for display, for the purpose of preventing the two images for display from appearing overlapping, are formed so as to match the lens pitch of the lenticular sheet.

Figure 3:
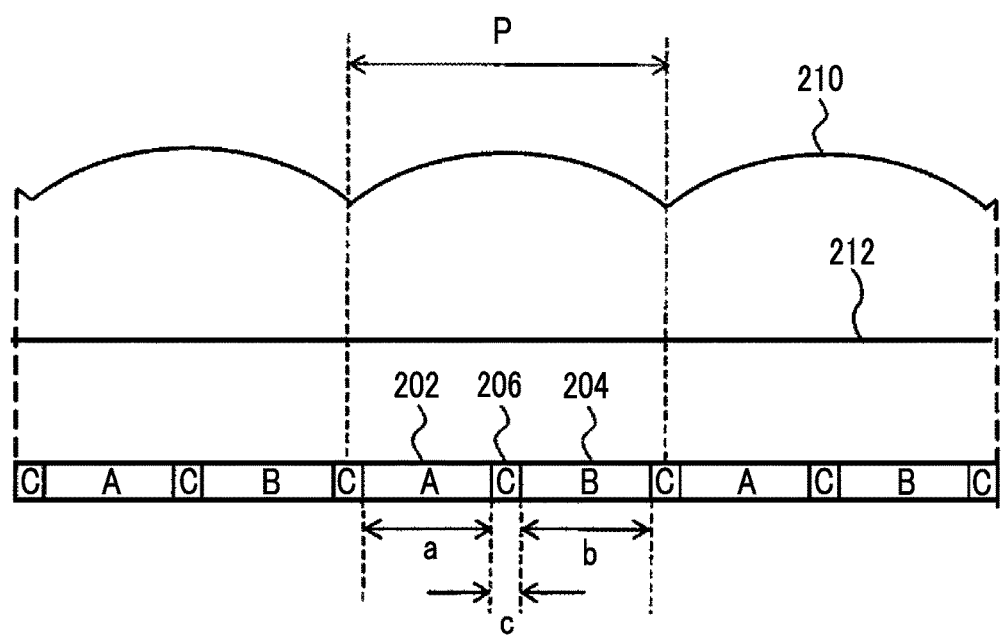
FIG. 3 is a schematic view illustrating a lenticular printed material prepared in an example by enlarging a portion thereof.

Specifically, as illustrated in FIG. 3, an A image column 202 and a B image column 204 respectively corresponding to two images (images A and B), as images for display, with a common background and different characters; and a C image column 206 corresponding to a background image (C image column 206) common to the images A and B which was provided between the A image column 202 and the B image column 204 were formed under each lens of a lens layer 210 through a resin layer 212. Further, the width of each image column was set by equally dividing the lens pitch P of the lens layer 210 into 24 parts, equally dividing the A image column 202 constituting the A image into $5/12$ parts (width a in FIG. 3), equally dividing the B image column 204 constituting the B image into $5/12$ parts (width b in FIG. 3), equally dividing the common image column 206 between the A image column 202 and the B image column 204 into $1/12$ parts (width c in FIG. 3), and the common image column 206 divided into $1/12$ equal parts was disposed between the A image column 202 and the B image column 204 which were adjacent to each other between lenses.

<Correction of Position of Parallax Picture>

In the preparation of the lenticular printed material, the position of the parallax picture was corrected by performing a position correcting step as described below.

In the formation of the parallax picture, after the drying and fixing, the position information of the pitch of the lens layer of the lenticular sheet and the position information of the parallax picture were detected using optical sensors after the parallax picture was formed on the ink receiving layer of the lenticular sheet.

Based on the detected position information of the pitch of the lens layer and the detected position information of the parallax picture, the deviation therebetween was calculated by the calculation means, and then the position for jetting the ink in the subsequent image recording was determined based on this calculation result. Further, the position of the parallax picture to be formed on the ink receiving layer of the lenticular sheet was corrected by jetting the ink to the determined position for jetting the ink.

[Evaluation]

The obtained lenticular printed material was evaluated as follows. The evaluation results are listed in Table 1.

<Image Sharpness>

The image sharpness of the lenticular printed material was visually evaluated. The image sharpness was evaluated based on the detail reproducibility of an image, and the sharpness was high as the details were reproduced. The score 1 or 2 is at an acceptable level.

1: The image sharpness is high.
2: The image sharpness is slightly inferior.
3: The image sharpness is poor.

<Image Switching Properties>

The image switching properties of the lenticular printed material were visually evaluated. Specifically, the observation was made by setting the distance (observation distance) from an observer's eyes to the lenticular printed material to 500 mm, a circle having a radius of 500 mm was assumed to be present on a plane perpendicular to the longitudinal direction in which the lenticular lenses of the lenticular printed material were arranged, and an angle θ at which an A image and a B image were switched was acquired when eyes were moved along the circle. As the angle θ was smaller, the image switching properties are excellent. The evaluation was performed based on the following standard.

1: 0°<θ≤2.5°
2: 2.5°<θ≤5.0°
3: 5.0°<θ≤7.5°

<Image Cloudiness>

The cloudiness of the image of the lenticular printed material was visually observed, and the transparency was evaluated based on the following evaluation standard. The score 1 or 2 is at an acceptable level.

1: The image was not clouded.
2: The image was slightly clouded, but was at an acceptable level.
3: The cloudiness was not acceptable.

<Productivity>

The number of produced sheets of the lenticular printed material per hour was counted, and the productivity was evaluated.

Examples 2 to 4

Lenticular sheets and lenticular printed materials were prepared in the same manner as in Example 1 except that the dried layer thickness of the ink receiving layer was changed to 9 μm, 5 μm, or 2 μm. The dried layer thickness, the void volume, and the light transmittance of the ink receiving layer of the lenticular sheet of each example are as listed in Table 1.

Each of the evaluations described above was performed using each of the prepared lenticular printed materials. The evaluation results are listed in Table 1.

Example 5

A lenticular sheet and a lenticular printed material were prepared in the same manner as in Example 3 except that the amount of SUPERFLEX 650 of the coating solution 1 for forming an ink receiving layer was changed to 0 parts (not containing) from 1.2 parts and the amount of ZIRCOSOL ZA-30 was changed to 0 parts (not containing) from 0.49 parts. The dried layer thickness, the void volume, and the light transmittance of the ink receiving layer of the lenticular sheet 5 of Example 5 are as listed in Table 1.

Each of the evaluations described above was performed using the prepared lenticular printed material. The evaluation results are listed in Table 1.

Comparative Example 1

A lenticular sheet and a lenticular printed material were prepared in the same manner as in Example 1 except that the ink receiving layer was not formed. The lenticular sheet of Comparative Example 1 was set as a comparative lenticular sheet 1.

Each of the evaluations described above was performed using the prepared lenticular printed material. The evaluation results are listed in Table 1.

Comparative Example 2

A lenticular sheet and a lenticular printed material were prepared in the same manner as in Example 3 except that the amount of the polyvinyl alcohol-dissolved solution of the coating solution 1 for forming an ink receiving layer was changed to 42.7 parts. The dried layer thickness, the void volume, and the light transmittance of the ink receiving layer of the lenticular sheet 2 of Comparative Example 2 are as listed in Table 1.

Each of the evaluations described above was performed using the prepared lenticular printed material. The evaluation results are listed in Table 1.

Comparative Example 3

A lenticular sheet and a lenticular printed material were prepared in the same manner as in Example 1 except that the coating solution for forming an ink receiving layer was changed to a coating solution for forming a comparative ink receiving layer with the following composition and the dried layer thickness of the ink receiving layer was changed to 4 μm. Further, the lenticular sheet of Comparative Example 3 was set as a comparative lenticular sheet 3.

~Composition of Coating Solution for Forming Comparative Ink Receiving Layer~

| | |
|---|---|
| ARROW BASE (registered trademark) SE-1020 (polyolefin resin emulsion, manufactured by Unitika Ltd.) | 99.9% by mass |
| CAPSTONE (registered trademark) FS-63 (surfactant, manufactured by Dupont) | 0.1% by mass |

Comparative Example 4

A lenticular sheet and a lenticular printed material were prepared in the same manner as in Example 1 except that the drying temperature for the image forming conditions was changed to an ink receiving layer surface temperature of 25° C.

TABLE 1

| | | Dried layer thickness of ink receiving layer (μm) | Void volume of ink receiving layer (%) | Light transmittance of ink receiving layer (%) | Ink receiving layer surface temperature in drying step (° C.) | Image sharpness | Image switching properties | Image cloudiness | Productivity (sheets/hr) |
|---|---|---|---|---|---|---|---|---|---|
| Example 1 | Lenticular sheet 1 | 15 | 55 | 90 | 50 | 1 | 1 | 2 | 2880 |
| Example 2 | Lenticular sheet 2 | 9 | 55 | 93 | 50 | 1 | 1 | 1 | 2880 |
| Example 3 | Lenticular sheet 3 | 5 | 55 | 95 | 50 | 1 | 1 | 1 | 2880 |
| Example 4 | Lenticular sheet 4 | 2 | 55 | 97 | 50 | 2 | 2 | 1 | 2880 |
| Example 5 | Lenticular sheet 5 | 5 | 70 | 95 | 50 | 1 | 1 | 1 | 2880 |
| Comparative Example 1 | Comparative lenticular sheet 1 | — | — | — | 50 | * | * | * | * |
| Comparative Example 2 | Comparative lenticular sheet 2 | 5 | 45 | 93 | 50 | 3 | 3 | 1 | 2880 |
| Comparative Example 3 | Comparative lenticular sheet 3 | 4 | 0 | 97 | 50 | 2 | 3 | 1 | 2880 |
| Comparative Example 4 | Comparative lenticular sheet 1 | 35 | 60 | 90 | 25 | * | * | * | * |

* The evaluation was not able to be performed because the image was not fixed.

As listed in Table 1, it was understood that each of the lenticular sheet printed materials in the examples has excellent productivity since the lenticular printed materials showed excellent results in all evaluations of the image sharpness, the image switching properties, and the image cloudiness.

Further, the bonding operation does not need to be performed during the production of the lenticular printed materials of the examples. Accordingly, the lenticular printed materials of the examples have excellent productivity compared to lenticular printed materials to be produced by forming an image on other paper of the related art and bonding the paper to the lenticular sheet. Further, the bonding operation requires a bonding time of 1 minute or longer per one sheet.

As listed in Table 1, it was understood that an image was not able to be fixed in a case where a parallax picture was intended to be formed on a lenticular sheet that did not include an ink receiving layer as in Comparative Example 1. Therefore, a desired lenticular printed material was not able to be obtained in a case where a lenticular sheet that did not include an ink receiving layer was used.

Further, since the lenticular sheet having an ink receiving layer with a void volume of less than 50% as in Comparative Example 2 and the lenticular sheet which had a void volume of 0% and did not have a porous structure as in Comparative Example 3 had degraded image sharpness and image switching properties, a lenticular printed material with a desired parallax picture was not able to be obtained.

Further, it was understood that an image was not able to be fixed in a case where the ink receiving layer surface temperature in the drying step was lower than 30° C. as in Comparative Example 4. Therefore, a desired lenticular printed material was not able to be obtained in a case where a lenticular sheet that did not include an ink receiving layer was used.

<Productivity Depending on Presence of Position Correcting Step>

In Example 1 described above, the lenticular printed material was prepared without performing the position correcting step. As the result, in a case of the method of producing a lenticular printed material without performing the position correcting step, as the number of produced sheets of lenticular printed material increases, the position of the parallax picture on the lens layer was deviated and thus the image switching properties are degraded.

What is claimed is:

1. A method of producing a lenticular printed material, comprising:

an ink jetting step of jetting an aqueous ink, containing a colorant, resin particles, water and a water-soluble high boiling point solvent, onto an ink receiving layer of a lenticular sheet including a resin layer, a lens layer disposed at one surface side of the resin layer, and the ink receiving layer, which is disposed at the other surface side of the resin layer, which contains particles and a resin, and which has a porous structure and a void volume of 50% or greater, according to an ink jetting method; and a drying step of drying the aqueous ink, under conditions in which a surface temperature of the ink receiving layer is set to 30° C. or higher, to form a parallax picture, wherein a thickness of the ink receiving layer is in a range of from 3 μm to 10 μm.

2. The method of producing a lenticular printed material according to claim 1, wherein, in the ink jetting step, the aqueous ink is jetted under jetting conditions in which resolution is set to 1200 dpi×1200 dpi or greater, according to the ink jet method, which is a single pass method.

3. The method of producing a lenticular printed material according to claim 1, wherein, in the ink jetting step, the aqueous ink is jetted under jetting conditions of a minimum liquid droplet size of 3 pl or less.

4. The method of producing a lenticular printed material according to claim 2, wherein, in the ink jetting step, the aqueous ink is jetted under jetting conditions of a minimum liquid droplet size of 3 pl or less.

5. The method of producing a lenticular printed material according to claim 1, further comprising:

a position correcting step of correcting a position for jetting the aqueous ink to be jetted onto the ink receiving layer based on position information of the parallax picture on the lens layer.

6. The method of producing a lenticular printed material according to claim 4, further comprising a position correcting step of correcting a position for jetting the aqueous ink to be jetted onto the ink receiving layer based on position information of the parallax picture on the lens layer.

7. A lenticular sheet, comprising:

a resin layer;

a lens layer disposed on one surface side of the resin layer; and an ink receiving layer, which is disposed on the other surface side of the resin layer, contains particles and a resin, and has a porous structure and a void volume of 50% or greater, wherein a thickness of the ink receiving layer is in a range of from 3 μm to 10 μm.

8. The lenticular sheet according to claim 7, wherein:

the particles are gas phase method silica particles, and the resin contained in the ink receiving layer is a polyvinyl alcohol-based resin.

9. The lenticular sheet according to claim 7, wherein the void volume of the ink receiving layer is in a range of from 50% to 75%.

10. The lenticular sheet according to claim 7, wherein a light transmittance of the ink receiving layer is 80% or greater.

11. The lenticular sheet according to claim 7, wherein an average primary particle diameter of the particles contained in the ink receiving layer is 2 μm or less.

12. The lenticular sheet according to claim 7, wherein the void volume of the ink receiving layer is in a range of from 50% to 75%, a light transmittance of the ink receiving layer is 80% or greater, and an average primary particle diameter of the particles contained in the ink receiving layer is 2 μm or less.

13. The lenticular sheet according to claim 7, further comprising an interlayer which is provided between the resin layer and the lens layer.

14. The lenticular sheet according to claim 13, wherein the lens layer and the interlayer are coextruded.

* * * * *